(12) United States Patent
Kawakatsu

(10) Patent No.: US 7,545,508 B2
(45) Date of Patent: Jun. 9, 2009

(54) INTERFEROMETRIC APPARATUS UTILIZING A CANTILEVER ARRAY TO MEASURE A SURFACE

(75) Inventor: Hideki Kawakatsu, Tokyo (JP)

(73) Assignee: The Foundation For The Promotion Of Industrial Science, Tokyo (JP)

( * ) Notice: Subject to any disclaimer, the term of this patent is extended or adjusted under 35 U.S.C. 154(b) by 211 days.

(21) Appl. No.: 11/454,986

(22) Filed: Jun. 19, 2006

(65) Prior Publication Data

US 2006/0231757 A1    Oct. 19, 2006

Related U.S. Application Data

(62) Division of application No. 10/481,443, filed as application No. PCT/JP02/05835 on Jun. 12, 2002, now Pat. No. 7,220,962.

(51) Int. Cl.
*G01B 9/02* (2006.01)
*G01B 11/02* (2006.01)

(52) U.S. Cl. .................. 356/501; 356/486

(58) Field of Classification Search ......... 356/485, 356/486, 501, 502; 73/655, 657
See application file for complete search history.

(56) References Cited

U.S. PATENT DOCUMENTS

| | | | | | |
|---|---|---|---|---|---|
| 4,935,634 | A | * | 6/1990 | Hansma et al. ......... 250/559.23 |
| 5,141,319 | A | * | 8/1992 | Kajimura et al. ............ 356/486 |
| 5,214,282 | A | | 5/1993 | Yamaguchi et al. | |
| 5,283,442 | A | * | 2/1994 | Martin et al. ........... 250/559.22 |
| 5,294,804 | A | * | 3/1994 | Kajimura ................ 250/559.31 |
| 5,298,975 | A | | 3/1994 | Khoury et al. | |
| 5,376,790 | A | * | 12/1994 | Linker et al. ................ 250/306 |
| 5,463,897 | A | * | 11/1995 | Prater et al. .................... 73/105 |
| 5,465,046 | A | * | 11/1995 | Campbell et al. ........... 324/244 |
| 5,852,233 | A | * | 12/1998 | Arnold et al. .................. 73/105 |
| 5,939,709 | A | * | 8/1999 | Ghislain et al. ............. 250/216 |
| 6,196,061 | B1 | * | 3/2001 | Adderton et al. .............. 73/105 |
| 7,414,731 | B2 | * | 8/2008 | Chu et al. .................... 356/501 |
| 7,463,364 | B2 | * | 12/2008 | Yacoubian .................. 356/502 |
| 2004/0060358 | A1 | * | 4/2004 | Datskos ....................... 73/655 |
| 2006/0162455 | A1 | | 7/2006 | Kawakatsu | |

FOREIGN PATENT DOCUMENTS

EP          1054249          11/2000

(Continued)

OTHER PUBLICATIONS

Melles Griot catalogue, 1995, Bibby Electro-Optics Company, Rev. A, p. 67-2.*

(Continued)

*Primary Examiner*—Patrick J Connolly
*Assistant Examiner*—Scott M Richey
(74) *Attorney, Agent, or Firm*—Oblon, Spivak, McClelland, Maier & Neustadt, P.C.

(57) ABSTRACT

A cantilever array having a simple structure and being able to reliably detect a surface of a sample, a method for fabricating the same, a scanning probe microscope, a sliding apparatus of a guiding and rotating mechanism, a sensor, a homodyne laser interferometer, a laser Doppler interferometer having an optically exciting function for exciting a sample, each using the same, and a method for exciting cantilevers. The cantilever array includes a large number of compliant cantilevers sliding on a surface of a sample.

7 Claims, 16 Drawing Sheets

| | FOREIGN PATENT DOCUMENTS | |
|---|---|---|
| JP | 4-102008 | 4/1992 |
| JP | 10-81951 | 3/1998 |
| JP | 2000-65716 | 3/2000 |
| JP | 2000-199737 | 7/2000 |
| JP | 2001-91441 | 4/2001 |

OTHER PUBLICATIONS

U.S. Appl. No. 11/454,989, filed Jun. 19, 2006, Kawakatsu.
U.S. Appl. No. 11/454,986, filed Jun. 19, 2006, Kawakatsu.
U.S. Appl. No. 11/454,987, filed Jun. 19, 2006, Kawakatsu.

* cited by examiner

FIG. 1
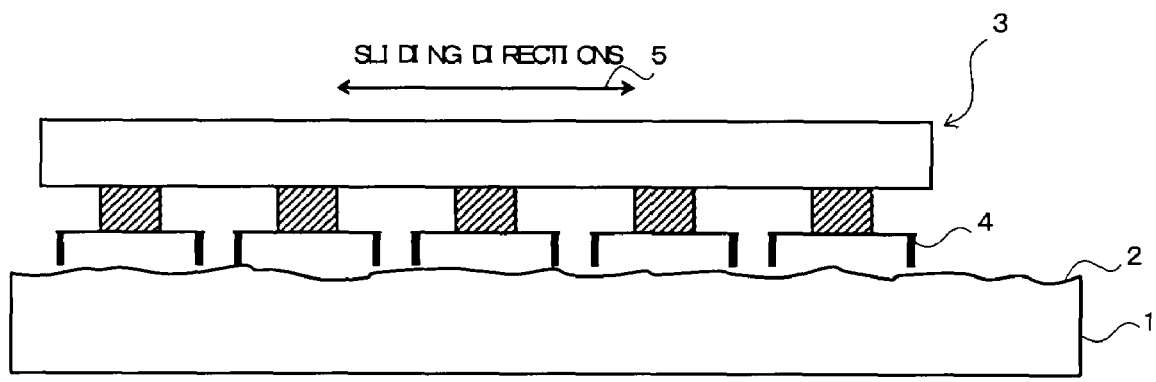
FIG. 2
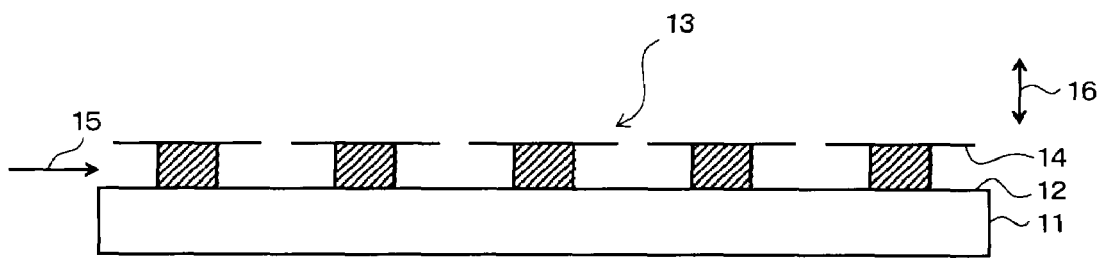
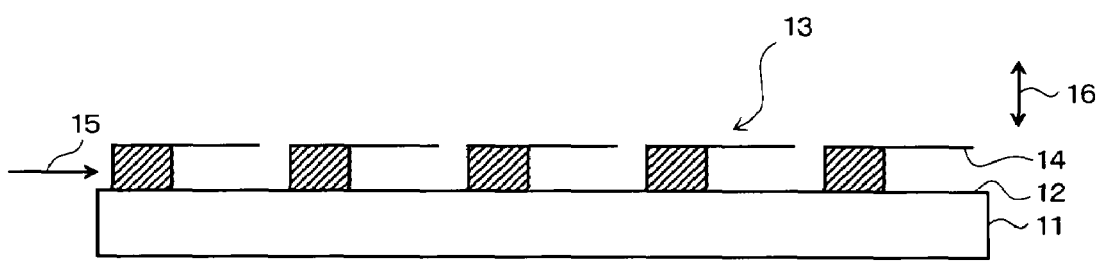

F I G. 3
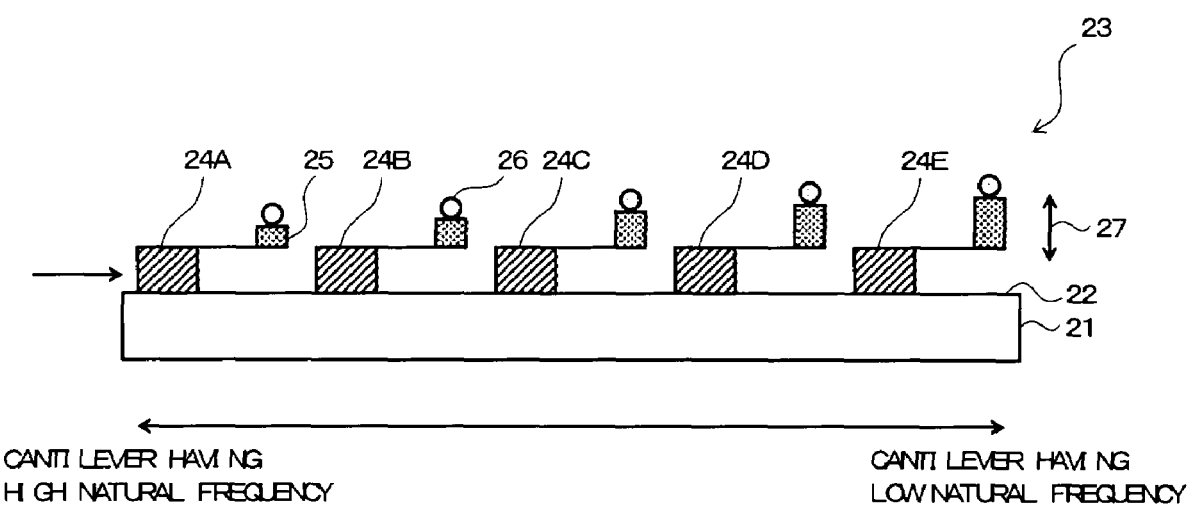

FIG. 4
(a)
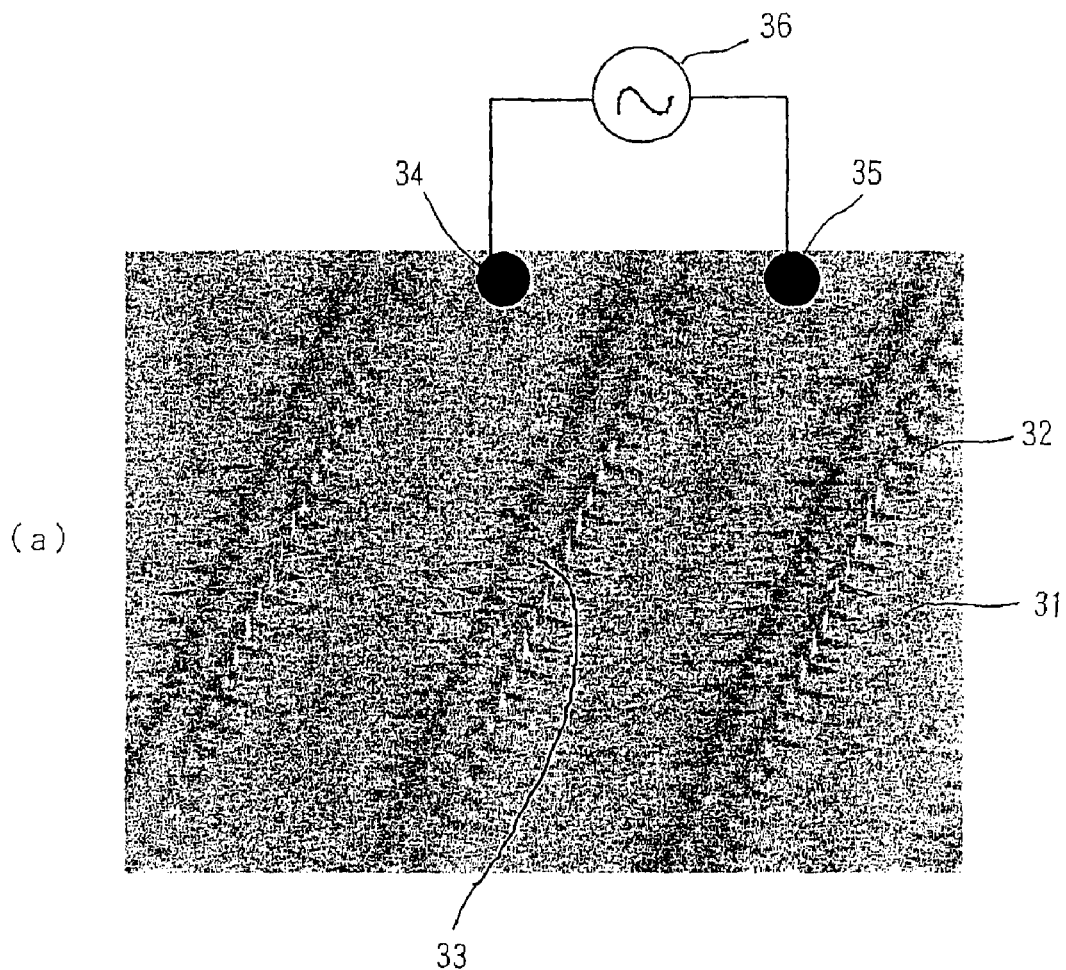
(b)
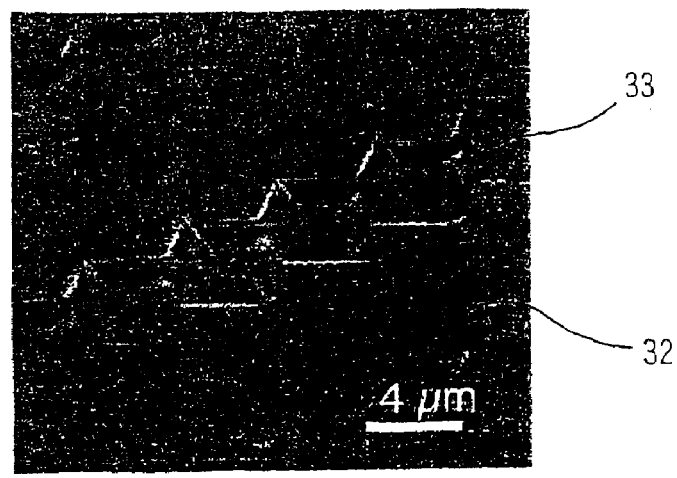

F I G. 10
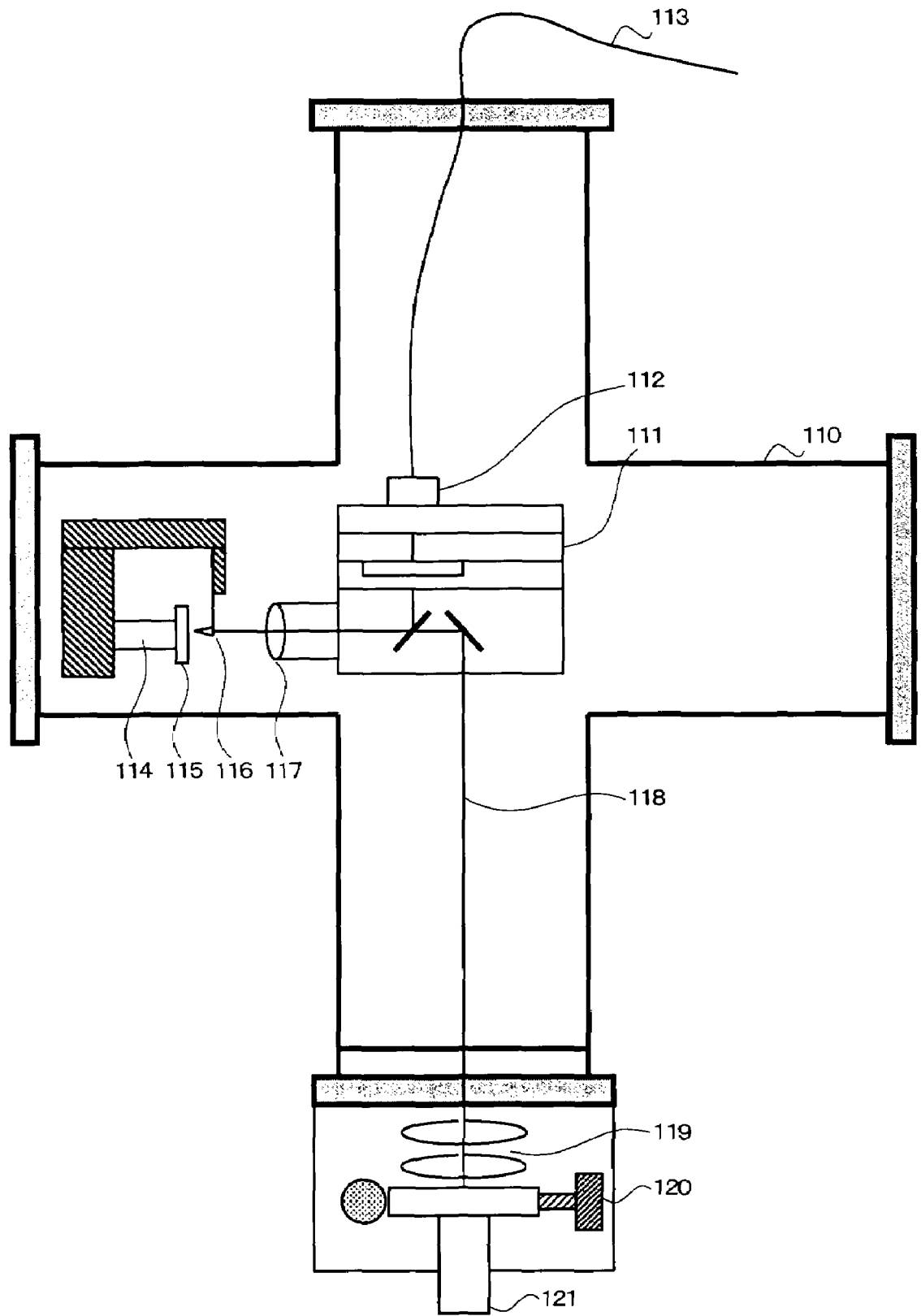

INTERFEROMETRIC APPARATUS UTILIZING A CANTILEVER ARRAY TO MEASURE A SURFACE

CROSS REFERENCE TO RELATED APPLICATIONS

This application is a divisional of U.S. application Ser. No. 10/481,443, filed on Aug. 2, 2004, which claims priority under 35 U.S.C. §371 to PCT/JP02/05835, filed Jun. 12, 2002, and is based upon and claims the benefits of priority from the prior Japanese Patent Application Nos. 2001-184604, filed on Jun. 19, 2001, and 2002-160482, filed on May 31, 2002, all of which are hereby incorporated by reference in their entirety.

TECHNICAL FIELD

The present invention relates to a cantilever array having a single nano-sized mechanical oscillator or at least a million of nano-sized mechanical oscillators per square centimeter arranged in an array configuration, a method for fabricating the same, a scanning probe microscope, a sliding apparatus of a guiding and rotating mechanism, a sensor, a homodyne laser interferometer, a laser Doppler interferometer having an optically exciting function for exciting a sample, each using the same, and a method for exciting cantilevers.

BACKGROUND ART

The inventor has proposed a nanocantilever having a single nanometer-sized mechanical oscillator or at least a million of nano-sized mechanical oscillators per square centimeter arranged in an array configuration.

DISCLOSURE OF INVENTION

However, the proposed nanocantilever has a variety of problems in practical uses.

In order to further improve the nanocantilever, the present invention provides a scanning probe microscope in which probe nanometer-sized mechanical oscillators having natural frequencies of 1 MHz to 1 GHz are formed, for example, on an Si wafer by making use of a semiconductor processing technique, and a chip having the oscillators lying in contact with a sliding surface is disposed so as to provide a self-propelled probe; by providing each oscillator with a cantilever-shaped member, exerting a vibration on it, and propagating a surface acoustic wave, the surface acoustic wave having an amplitude of a few nm is amplified with a Q factor of the oscillator so as to improve efficiencies of an actuator and an optical modulator; or while the cantilever-shaped members are sliding on the surface of a sample, fine irregularities are detected as changes in luminance in accordance with reflecting states of light with which the surface is irradiated.

Also, its object is to provide a scanning probe microscope for obtaining an image from a change in vibration frequency and a sensor for measuring a substance or a mass, both by exciting each cantilever with light.

It is an object of the present invention to provide a cantilever array having a simple structure and being able to reliably detect a surface of a sample, a method for fabricating the same, a scanning probe microscope, a sliding apparatus of a guiding and rotating mechanism, a sensor, a homodyne laser interferometer, a laser Doppler interferometer having an optically exciting function for exciting a sample, each using the same, and a method for exciting cantilevers.

In order to achieve the above objects, according to the present invention,

[1] a cantilever array includes a large number of compliant cantilevers sliding on a surface of a sample,

[2] in the cantilever array set forth in [1], the cantilever array is densely disposed on the surface of the sample so as to propagate a surface acoustic wave in the sample,

[3] a cantilever array includes a plurality of cantilevers disposed so as to have respectively different natural frequencies,

[4] a method for fabricating a cantilever array includes the steps of: controlling a potential of each row of the cantilever array prepared from a single-crystal silicon so as to generate a high electric field between corresponding mutually opposing probes; and designating an orientation of a whisker crystal by using an electrophoresis in liquid or an electric field in gas so as to perform a growth control of the whisker crystal,

[5] in the method for fabricating a cantilever array set forth in [4], the whisker crystal is a carbon nanotube,

[6] a method for fabricating a cantilever array includes the steps of: disposing a flat electrode so as to face a surface of a single-crystal-silicon cantilever array; generating a concentrated electric field at the top of each probe; and growing needle crystals in the normal direction of a substrate,

[7] a scanning probe microscope is passively controlled such that each probe bears its share of the own weight of a chip having cantilevers and an external load, and a surface pressure of the probe lies within a certain range,

[8] a sliding apparatus of a guiding and rotating mechanism is passively controlled such that each probe bears its share of the own weight of a chip having cantilevers and an external load, and a surface pressure of the probe lies within a certain range,

[9] in a scanning probe microscope, fine irregularities of a sample corresponding to displacements of large number of cantilevers caused by an optical lever are detected as changes in luminance by an image capture apparatus,

[10] in a substance or mass sensor, fine irregularities of a sample corresponding to displacements of large number of cantilevers caused by an optical lever are detected as changes in luminance by an image capture, apparatus,

[11] in a scanning probe microscope, cantilevers are irradiated with light and an interference luminance corresponding to a micro-cavity length between each cantilever, and a reference surface is observed by using an image capture apparatus,

[12] in substance or mass sensor, cantilevers are irradiated with light, and an interference luminance corresponding to a micro-cavity length between each cantilever and a reference surface is observed by using an image capture apparatus,

[13] in a scanning probe microscope, fine irregularities of a sample corresponding to displacements of large number of cantilevers caused by an optical interferometer are detected as changes in luminance by an image capture apparatus,

[14] in the scanning probe microscope set forth in [13], a range of positions at which interference occurs is limited by using a low-coherent light source as a light source so as to reduce an affect of parasitic interference,

[15] in a substance or mass sensor, fine irregularities of a sample corresponding to displacements of large number of cantilevers caused by an optical interferometer are detected as changes in luminance by an image capture apparatus,

[16] in the substance or mass sensor set forth in [15], a range of positions at which interference occurs is limited by using a low-coherent light source as a light source so as to reduce an affect of parasitic interference,

[17] in a scanning probe microscope, a heterodyne laser Doppler meter is used for detecting a vibration of a cantilever,

[18] in a substance or mass sensor, a heterodyne laser Doppler meter is used for detecting a vibration of a cantilever,

[19] a scanning probe microscope includes an optical microscope coaxially disposed with a cantilever-detecting optical system,

[20] a substance or mass sensor includes an optical microscope coaxially disposed with a cantilever-detecting optical system,

[21] an optical-fiber homodyne laser interferometer includes a fine-cantilever-detecting optical system for positioning a fine cantilever at a laser spot,

[22] the optical-fiber homodyne laser interferometer set forth in [21] includes a fine-cantilever-detecting optical system for positioning the fine cantilever at a laser spot and an optical microscope coaxially disposed with the fine-cantilever-detecting optical system,

[23] in a laser Doppler interferometer having an optically exciting function for exciting a sample, the sample is irradiated with modulated light via a cantilever by using an output signal of the laser Doppler interferometer and a vibration of the sample is excited by the irradiation light so that the frequency characteristic and the mechanical characteristic of the sample are measured,

[24] in the laser Doppler interferometer having the optically exciting function for exciting a sample, set forth in [23], a self-excited loop including the laser Doppler interferometer is formed,

[25] in the laser Doppler interferometer having the optically exciting function for exciting a sample, set forth in [23], light is modulated by using a signal whose frequency is swept by a network analyzer, a vibration of the sample is excited by using the modulated light, and an output of the laser Doppler interferometer observing a vibration of the sample at the same time is connected to a signal input of the network analyzer so as to measure the frequency characteristic of the sample,

[26] in the laser Doppler interferometer having the optically exciting function for exciting a sample, set forth in [23], the light for vibration excitation is superimposed on measuring light of the laser Doppler interferometer so as to measure and excite a vibration with a single light path,

[27] in the laser Doppler interferometer having the optically exciting function for exciting a sample, set forth in [23], by realizing a self-excited vibration of the cantilever at its natural frequency, the interaction between the top of the cantilever and the sample and a change in mass accreted on the top of the cantilever are detected as a change in self-excited frequency or a change in amplitude or phase of self-excited vibrations,

[28] a method for exciting cantilevers includes the step of irradiating the rear surface of a substrate having a large number of cantilevers disposed thereon with light having a uniform quantity and a uniform wavelength so as to self-excite all cantilevers at respective natural frequencies thereof,

[29] a method for exciting cantilevers includes the step of irradiating the rear surface of a substrate having a large number of cantilevers disposed thereon with intensity modulated light so as to bring the modulation frequency and the natural frequency of the cantilevers in agreement with each other,

[30] a method for exciting cantilevers includes the step of displacing a cantilever array itself or a physical object supported by the cantilever array by using a group of the cantilevers vibrating in the cantilever array,

[31] a method for exciting cantilevers includes the step of performing sensing or processing by using a group of the cantilevers vibrating in a cantilever array,

[32] a method for exciting cantilevers includes the step of irradiating a cantilever array with light having a uniform quantity so as to excite vibrations of the cantilevers and resultantly to cause clearances of air gaps to vary at a certain frequency so that quantities of reflected light and a transmitted light are modulated at the same frequency,

[33] a method for exciting cantilevers includes the step of irradiating a cantilever array formed by a group of cantilevers having respectively different natural frequencies with light having a uniform quantity so as to provide light modulated at a plurality of modulation frequencies as reflected light and/or transmitted light,

[34] a method for exciting cantilevers includes the step of irradiating a cantilever array with a light having a uniform quantity so as to generate traveling waves on the surfaces of the cantilevers and resultantly to modulate frequencies of reflected light and/or transmitted light, and

[35] a method for exciting cantilevers includes the step of irradiating a cantilever array formed by a group of cantilevers having respectively different natural frequencies with light having a uniform quantity so as to provide light having a plurality of frequencies as reflected light and/or transmitted light.

BRIEF DESCRIPTION OF THE DRAWINGS

FIG. 1 is a diagrammatic view of a nanocantilever array according to a first embodiment of the present invention.

FIG. 2 is a diagrammatic view of a nanocantilever array according to a second embodiment of the present invention.

FIG. 3 is a diagrammatic view of a nanocantilever array according to a third embodiment of the present invention.

FIG. 4 illustrates a nanocantilever array according to a fourth embodiment of the present invention.

FIG. 10 is a diagrammatic view of a scanning force microscope, a substance sensor, or a mass sensor (second example) according to an eleventh embodiment of the present invention, each using a heterodyne laser Doppler meter.

BEST MODE FOR CARRYING OUT THE INVENTION

Figure 5:
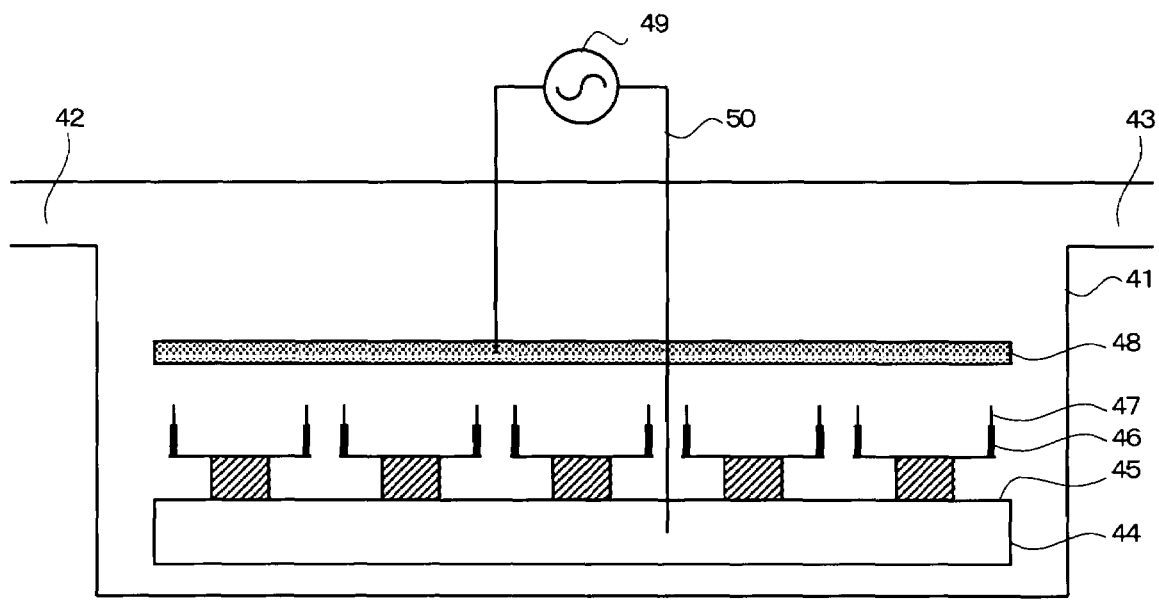
FIG. 5 is an illustration of a method for growing a needle crystal according to a fifth embodiment of the present invention.

Embodiments of the present invention will be described in detail.

FIG. 1 is a diagrammatic view of a nanocantilever array according to a first embodiment of the present invention. In this figure, with respect to reference numerals 1 to 5, 1 denotes a sample (substrate), 2 denotes a sliding surface of the substrate 1, 3 denotes a nanocantilever array, 4 denotes a large number of compliant nanocantilevers (oscillators), and 5 denotes sliding directions of the nanocantilever array 3.

When the nanocantilever array 3 formed by the large number of compliant nanocantilevers 4 is activated in the sliding directions 5, a condition under which the sliding surface 2 is very unlikely to provide a frictional condition is achieved.

FIG. 2 is a diagrammatic view of a nanocantilever array according to a second embodiment of the present invention. In this figure, with respect to reference numerals 11 to 16, 11 denotes a sample (substrate), 12 denotes a surface of the substrate 11, 13 denotes a nanocantilever array densely disposed on the surface 12 of the substrate 11, 14 denotes cantilevers (oscillators), 15 denotes a propagating direction of a surface acoustic wave, and 16 denotes vibrating directions of the cantilevers 14.

As shown in the figure, the cantilevers 14 are densely disposed on the surface 12 of the substrate 11 so as to propagate a surface acoustic wave in the substrate 11. Since the nanocantilever array 13 has a Q factor of about 10,000 in vacuum, a surface acoustic wave having an amplitude of a few nm is amplified with Q factors of the cantilevers (oscillators) 14.

Efficiencies of an actuator and an optical modulator can be improved by making use of the above phenomenon.

Meanwhile, the shape of the cantilever and symmetric and asymmetric properties thereof with respect to its supporting portion can be changed in accordance with its application.

FIG. 3 is a diagrammatic view of a nanocantilever array according to a third embodiment of the present invention, having a structure in which cantilevers have respectively different natural frequencies.

In this figure, with respect to reference numerals references 21 to 27, 21 denotes a sample (substrate), 22 denotes an upper surface of the substrate, 23 denotes a cantilever array, 24A to 24E denote cantilevers, 25 denotes probe masses, 26 denotes samples, and 27 denotes vibrating directions of the cantilevers.

In this embodiment, in the cantilever array 23, the cantilevers 24A to 24E are formed so as to have respectively different natural frequencies. In other words, the cantilever 24A has the highest natural frequency (small in probe mass) and the cantilever 24E has the lowest natural frequency (large in probe mass). In order to make the natural frequencies of the cantilevers 24A to 24E different from each other, sizes of probes serving as masses of the corresponding cantilevers or lengths of the corresponding cantilevers are determined so as to differ from each other. In order to make the sizes of the probes different from each other, the thickness of a top silicon layer of an SOI substrate is previously designed so as to have a gradient. In order to make the lengths of the cantilevers different from each other, for example, a method for providing a gradient to pitches of a mask is available.

By fixing the specific samples 26 to the cantilever array 23, a spectroscopy can be performed. In other words, any one of the cantilevers 24A to 24E having a natural frequency which is closest to a specific frequency characteristic of the samples 26 responds to the natural frequency and is detected in accordance with the vibration amplitude of the cantilever.

In the meantime, when a method for preparing cantilevers by using a single-crystal silicon is used, several millions to several hundred millions of cantilevers can be prepared by one operation on a chip having a few square centimeter.

Also, by disposing a large number of cantilevers in a frequency band over which an observation is performed, spectroscopy can be performed with a fine frequency spacing.

FIG. 4 illustrates a cantilever array prepared from a single-crystal silicon, according to a fourth embodiment of the present invention, wherein FIG. 4(a) is a perspective view of the cantilever array and FIG. 4(b) is a magnified perspective view of the same.

In these figures, with respect to reference numerals 31 to 36, 31 denotes a base substrate, 32 denotes a cantilever array, 33 denotes mutually opposing probes, 34 and 35 denote electrodes, and 36 denotes a power source.

A potential of each row of the cantilever array 32 prepared from a single-crystal silicon is controlled so as to generate a high electric field between the corresponding mutually opposing probes 33. Thus, a growth control of a whisker crystal such as a carbon-nanotube while designating a growing orientation of the same by using an electrophoresis in liquid or an electric field in gas is possible.

Although it has been heretofore difficult to control growing spots and orientations of fine needle samples, by controlling a potential of each of mutually opposing rows of the cantilever array 32, the above problem is solved. In addition, in the cantilever array 32, several millions to several hundred millions of cantilevers can be prepared by one operation, whereby fine needle samples can be prepared by one operation. In the single-crystal-silicon cantilever array, a silicon and a silicon oxide layer of the base substrate 31 are electrically insulated from each other at each cantilever row. Accordingly, an external potential can be applied on each row through wires or by injecting an electric charge.

FIG. 5 is an illustration of a method for growing a needle crystal according to a fifth embodiment of the present invention.

In this figure, with respect to reference numerals 41 to 50, 41 denotes a chamber, 42 denotes a gas feed port, 43 denotes a gas discharge port, 44 denotes a substrate, 45 denotes an upper surface of the substrate 44, 46 denotes a single-crystal-silicon cantilever array, 47 denotes needle-crystal growing spots, 48 denotes a flat electrode, 49 denotes an alternating-current power source, and 50 denotes lead wires.

The flat electrode 48 is disposed so as to face the single-crystal-silicon cantilever array 46 and a concentrated electric field is generated on the top of each probe so that needle crystals grow in the normal direction of the substrate 44.

Figure 6:
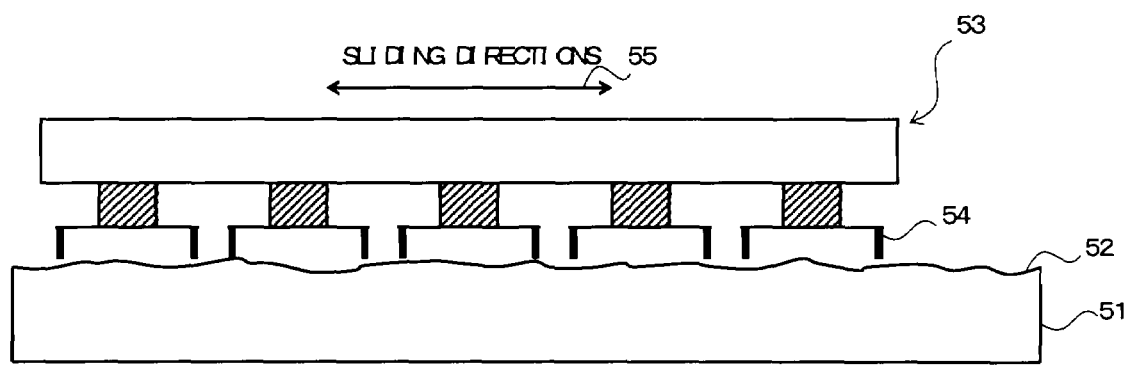
FIG. 6 is a diagrammatic view of a self-propelled, scanning probe microscope according to a sixth embodiment of the present invention.

FIG. 6 is a diagrammatic view of a self-propelled, scanning probe microscope according to a sixth embodiment of the present invention.

In this figure, with respect to reference numerals 51 to 55, 51 denotes a sample, 52 denotes a sliding surface of the sample 51, 53 denotes a probe (nanocantilever array), 54 denotes a large number of compliant nanocantilevers (oscillators), and 55 denotes sliding directions of the sample 51.

This embodiment serves so as to construct a self-propelled, scanning probe microscope or a guiding mechanism, as also shown in FIG. 1, which is passively controlled such that each probe 53 bears its share of the own weight of a chip having the cantilevers 54 and such that a surface pressure of the probe 53 lies within a certain range. As a result, a self-propelled, scanning probe microscope scanning with a force of several tens of nN or less can be achieved without performing an active control in the normal direction of the probe.

A displacement measurement of the cantilevers 54 covers one, a few, or all of them of the cantilever array 53.

In order to achieve a self-propelled type, a method with which a standing wave of light is generated between a substrate and the cantilevers 54 so as to cause each cantilever 54 to generate an isotropic vibration in the sliding directions 55 due to its structure is employed. Alternatively, a method with which a surface acoustic wave is generated in the sample 51 or in the cantilever array 53 so as to displace the cantilever array 53 is available.

Figure 7:
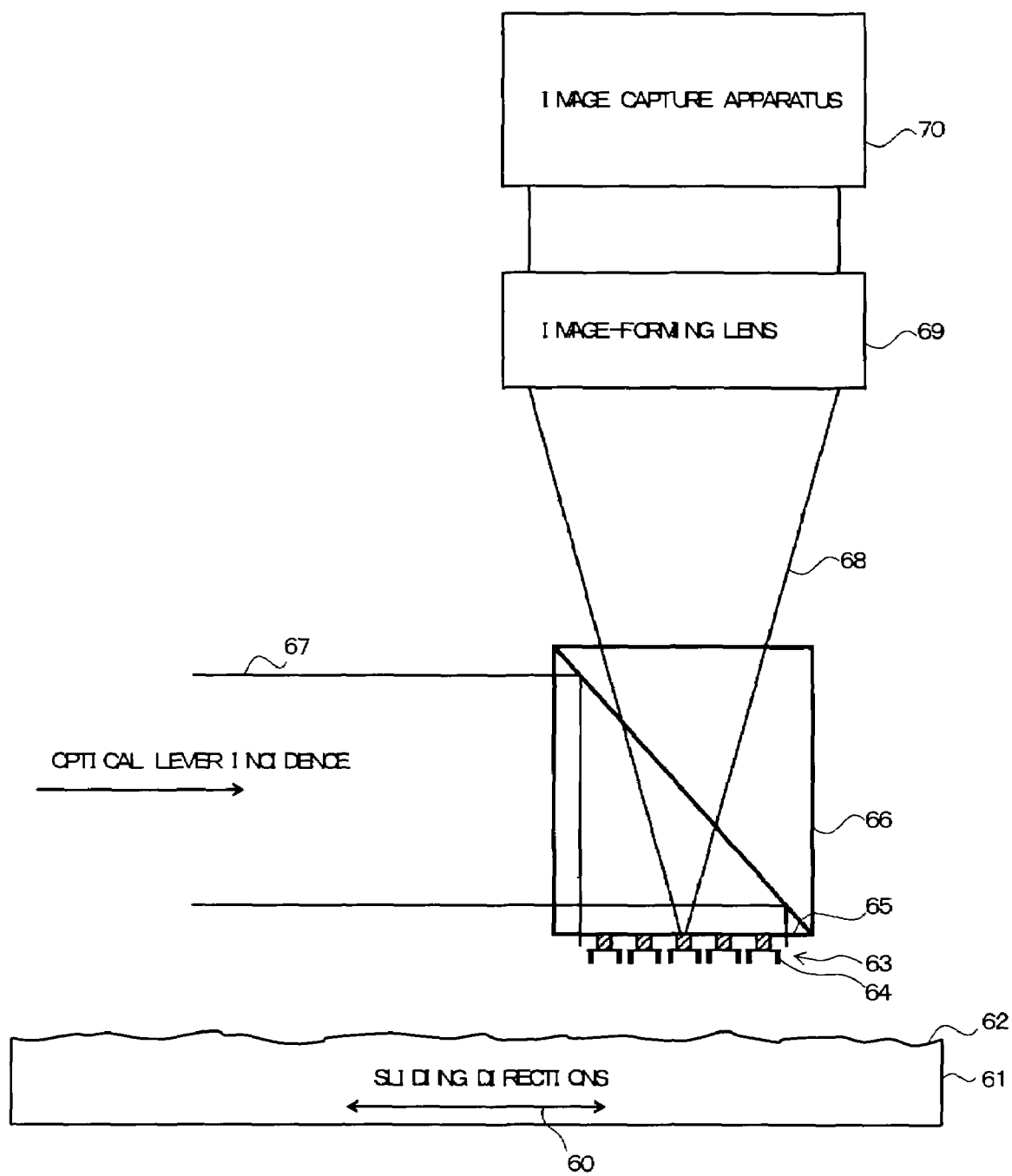
FIG. 7 is a diagrammatic view of a scanning probe microscope, a substance sensor, or a mass sensor according to a seventh embodiment of the present invention.

FIG. 7 is a diagrammatic view of a scanning probe microscope, a substance sensor, or a mass sensor according to a seventh embodiment of the present invention.

In this figure, with respect to reference numerals 60 to 70, 61 denotes a sample, 62 denotes a surface of the sample 61, 63 denotes a probe (nanocantilever array), 64 denotes a large number of compliant nanocantilevers (oscillators), 65 denotes an antireflective film, 66 denotes a beam splitter or a half-mirror, 67 denotes optical-lever incident light, 68 denotes reflected light, 69 denotes an image-forming lens, 70 denotes an image capture apparatus (image pickup device) such as a CCD camera, and 60 denotes sliding directions of the sample 61.

In this embodiment, when the optical-lever incident light 67 is incident on the probe 63, displacements of the nanocantilevers 64 cause the reflected light 68 representing fine irregularities of the surface 62 of the sample 61 to be captured into the image capture apparatus 70 via the image-forming lens 69.

More particularly, the cantilevers 64 are observed by using the image-forming lens 69 and the image capture apparatus 70 such as a CCD camera, and the cantilevers 64 are irradiated with the optical-lever incident light 67. The reflected light 68 in accordance with a posture of each cantilever 64 is incident on the image capture apparatus 70. Angular displacements of the cantilevers 64 allow the fine irregularities of the surface 62 of the sample 61 to be converted into changes in luminance in the image capture apparatus 70 such as a CCD camera.

By two-dimensionally scanning the sample 61 in a range sufficient to cover a pitch of the cantilevers 64, the entire surface 62 of the sample 61 can be observed.

As mentioned above, the entire surface of a sample can be observed by using optical-lever incident light and a large number of cantilevers.

Figure 8:
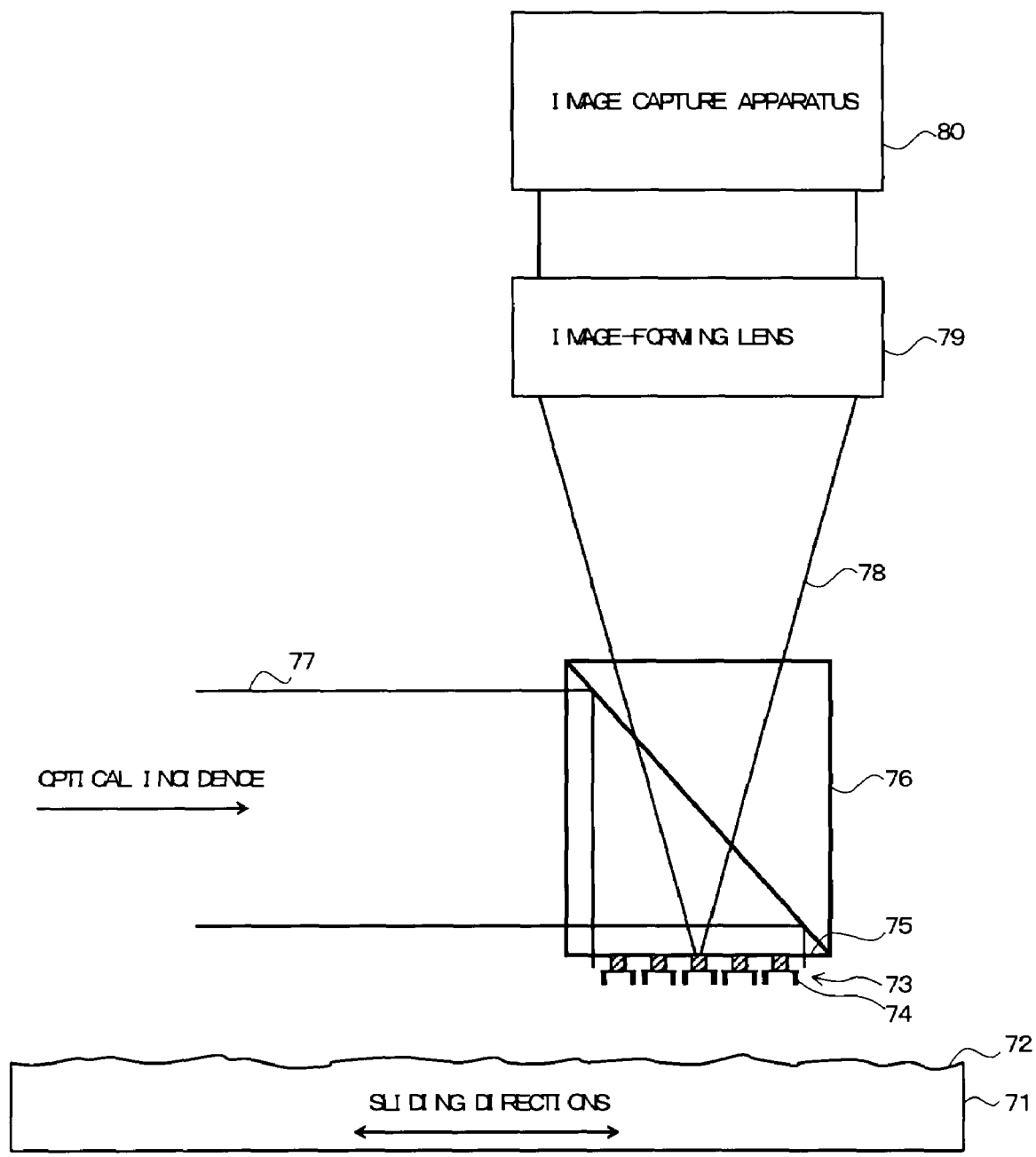
FIG. 8 is a diagrammatic view of a scanning probe microscope, a substance sensor, or a mass sensor according to an eighth embodiment of the present invention.

FIG. 8 is a diagrammatic view of a scanning probe microscope, a substance sensor, or a mass sensor according to an eighth embodiment of the present invention.

In this figure, with respect to reference numerals 71 to 80, 71 denotes a sample, 72 denotes a surface of the sample 71, 73 denotes fine interference cavities of a probe (nanocantilever array), 74 denotes a large number of compliant nanocantilevers (oscillators), 75 denotes a reference surface, 76 denotes a beam splitter or a half-mirror, 77 denotes incident light, 78 denotes reflected light, 79 denotes an image-forming lens, 80 denotes an image capture apparatus (image pickup device) such as a CCD camera.

As shown in the figure, the cantilevers 74 are observed by using the image-forming lens 79 and the image capture apparatus 80 such as a CCD camera and are irradiated with light. An interference luminance in accordance with a micro-cavity length between each cantilever 74 and the reference surface 75 is incident on the image capture apparatus 80.

As described above, by two-dimensionally scanning the sample 71 in a range sufficient to cover a pitch of the cantilevers 74, the entire surface 72 of the sample 71 can be observed.

This embodiment serves to construct a scanning probe microscope, a substance sensor, or a mass sensor in which displacements of a large number of cantilevers are detected by an optical interferometer.

Also, according to a ninth embodiment of the present embodiment, when displacements of a large number of cantilevers are to be detected by an optical interferometer, in order to reduce interference caused by other than a light lever, a method for reducing an affect of parasitic interference by using a low-coherent light source such as an SLD (super-luminescent diode) or a white light source so as to limit a range of positions at which interference occurs is available.

Figure 9:
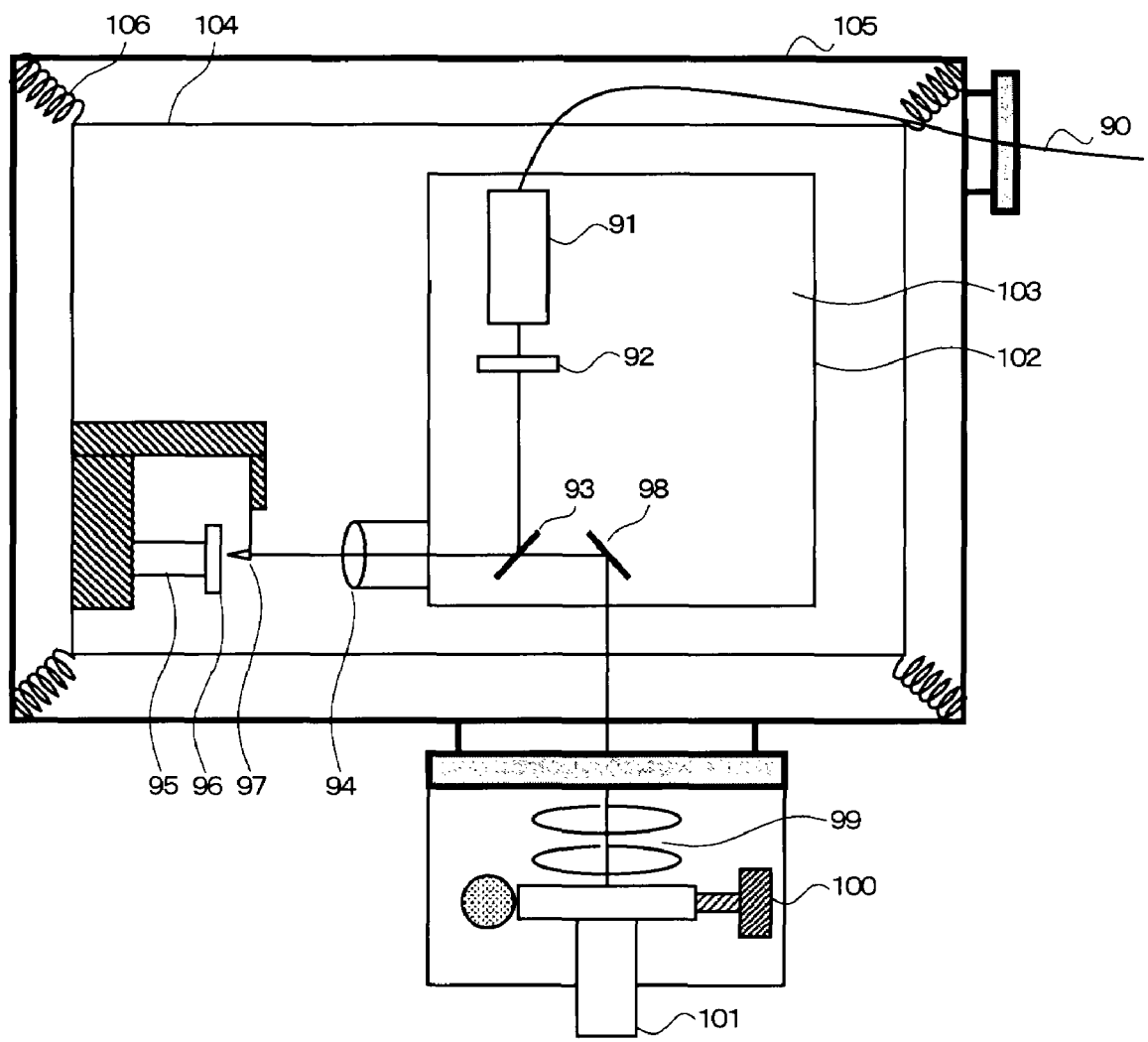
FIG. 9 is a diagrammatic view of a scanning force microscope, a substance sensor, or a mass sensor (first example) according to a tenth embodiment of the present invention, each using a heterodyne laser Doppler meter.

FIG. 9 is a diagrammatic view of a scanning force microscope, a substance sensor, or a mass sensor (first example) according to a tenth embodiment of the present invention, each using a heterodyne laser Doppler meter.

In this figure, with respect to reference numerals 90 to 106, 90 denotes an optical fiber, 91 denotes a laser emitter, 92 denotes a quarter wave plate, 93 denotes a half mirror, 94 denotes an objective lens, 95 denotes an XYZ piezo scanner, 96 denotes a sample, 97 denotes a cantilever, 98 denotes a mirror, 99 denotes an image-forming lens, 100 denotes an XY stage, 101 denotes an image capture apparatus (image pickup device) such as a CCD camera, 102 denotes an optical system unit, 103 denotes an XYZ positioning mechanism of the optical system unit 102, 104 denotes an AFM base plate, 105 denotes a vacuum chamber partition, and 106 denotes a stage-supporting spring.

FIG. 10 is a diagrammatic view of a scanning force microscope, a substance sensor, or a mass sensor (second example) according to an eleventh embodiment of the present invention, each using a heterodyne laser Doppler meter.

In this figure, with respect to reference numerals 110 to 121, 110 denotes a vacuum chamber, 111 denotes an optical semiconductor device, 112 denotes an electrode, 113 denotes a lead wire for feeding an electric power to the electrode 112, 114 denotes an XYZ piezo scanner of a sample, 115 denotes the sample, 116 denotes a cantilever, 117 denotes an objective lens, 118 denotes reflected light, 119 denotes an image-forming lens, 120 denotes an XY stage, and 121 denotes an image capture apparatus (image pickup device) such as a CCD camera.

Figure 11:
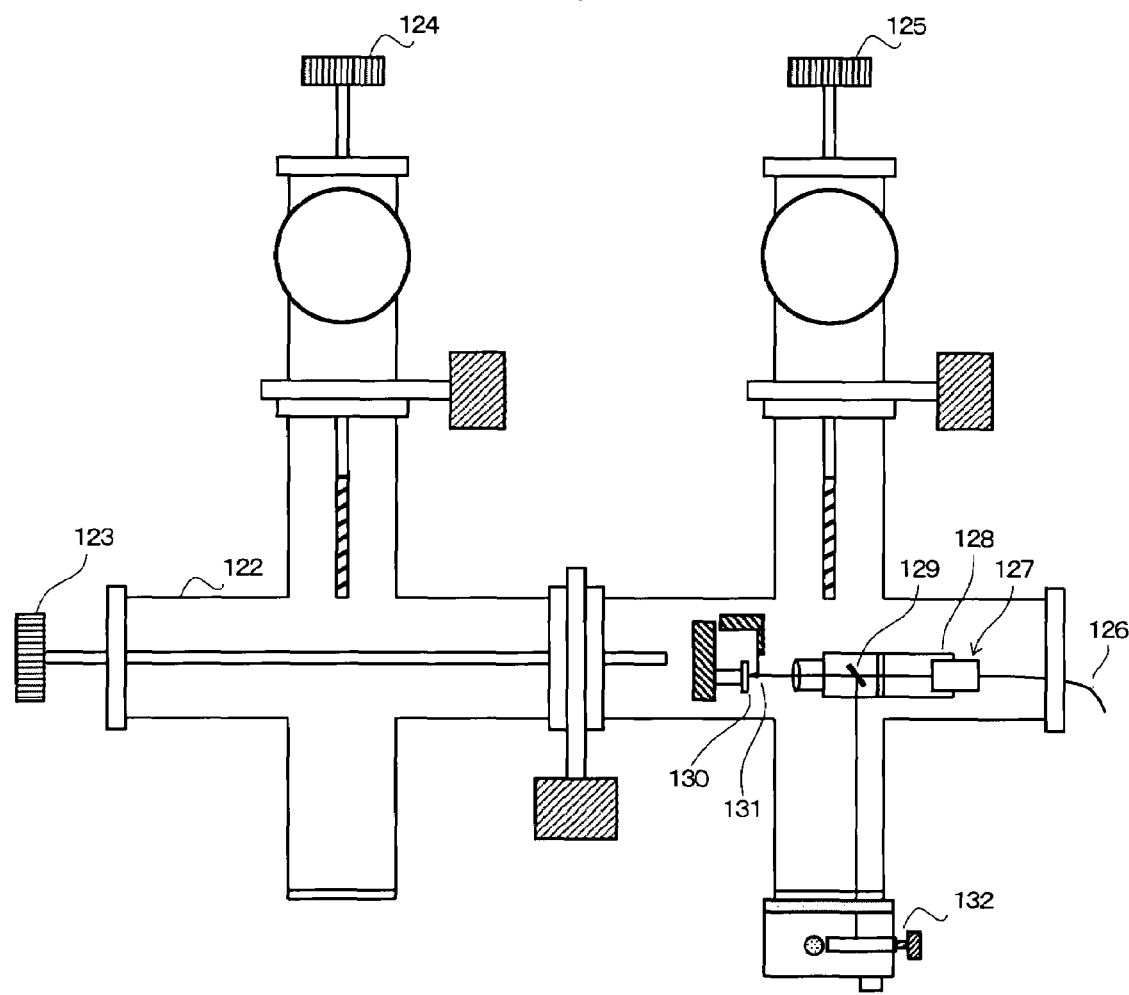
FIG. 11 is a diagrammatic view of a scanning force microscope, a substance sensor, or a mass sensor (third example) according to a twelfth embodiment of the present invention, each using a heterodyne laser Doppler meter.

FIG. 11 is a diagrammatic view of a scanning force microscope, a substance sensor, or a mass sensor (third example)

according to a twelfth embodiment of the present invention, each using a heterodyne laser Doppler meter.

In this figure, with respect to reference numerals 122 to 132, 122 denotes a sample-preparing vacuum chamber, 123 to 125 denote rods for transporting a sample and a cantilever, 126 denotes an optical fiber, 127 denotes an Optical system unit, 128 denotes a laser emitter, 129 denotes a beam splitter, 130 denotes the sample, 131 denotes the cantilever, and 132 denotes an image capture apparatus (image pickup device) such as a CCD camera.

Figure 12:
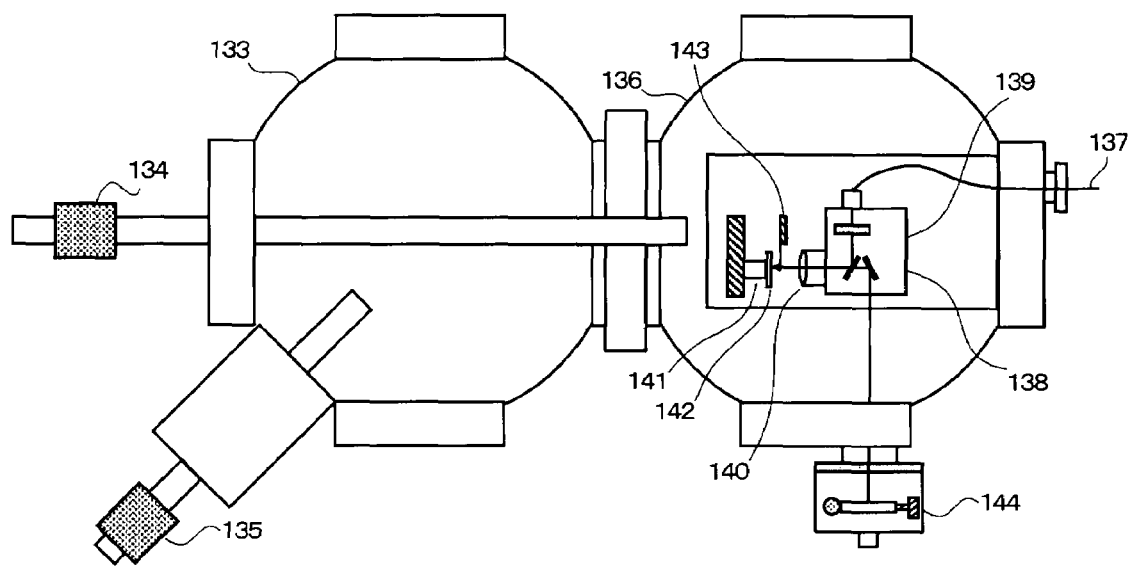
FIG. 12 is a diagrammatic view of a scanning force microscope, a substance sensor, or a mass sensor (fourth example) according to a thirteenth embodiment of the present invention, each using a heterodyne laser Doppler meter.

FIG. 12 is a diagrammatic view of a scanning force microscope, a substance sensor, or a mass sensor (fourth example) according to a thirteenth embodiment of the present invention, each using a heterodyne laser Doppler meter.

In this figure, with respect to reference numerals 133 to 144, 133 denotes a sample-preparing vacuum chamber, 134 and 135 denote rods for transporting a sample and a cantilever, 136 denotes a sample-observing vacuum chamber, 137 denotes an optical fiber, 138 denotes a cantilever-detecting optical system, 139 denotes a laser-emitter XYZ stage, 140 denotes a laser Doppler emitter, 141 denotes a sample XYZ stage, 142 denotes the sample, 143 denotes the cantilever, and 144 denotes an image capture apparatus (image pickup device) such as a CCD camera.

As shown in FIGS. 9 to 12, a scanning force microscope, a substance sensor, or a mass sensor, each using a heterodyne laser Doppler meter, can be constructed. In other words, the heterodyne laser Doppler meter can be used for detecting a vibration of a cantilever.

In a widely-used optical lever mechanism, a detection limit of resolution decreases when a laser spot is made smaller. In a laser Doppler meter, the diameter of a laser spot can be decreased to an order of 1 micron, and also in principle, decreasing the spot diameter does not cause detection sensitivity to deteriorate as is the case in an optical lever meter.

In an optical lever mechanism or a homodyne interferometer, a higher frequency of a detection signal does not lead to an advantage in improving an S/N ratio except for reducing a 1/f noise. As opposed to the above, since a signal of a laser Doppler meter detects a Doppler effect, a signal intensity becomes higher as a speed or a vibration frequency of a measuring object becomes higher.

Thus, there is an advantage in that the laser Doppler meter can be used for detecting a vibration of a compact cantilever having a high natural frequency. In other words, by performing a heterodyne measurement, detection with a higher S/N ratio can be achieved.

Figure 13:
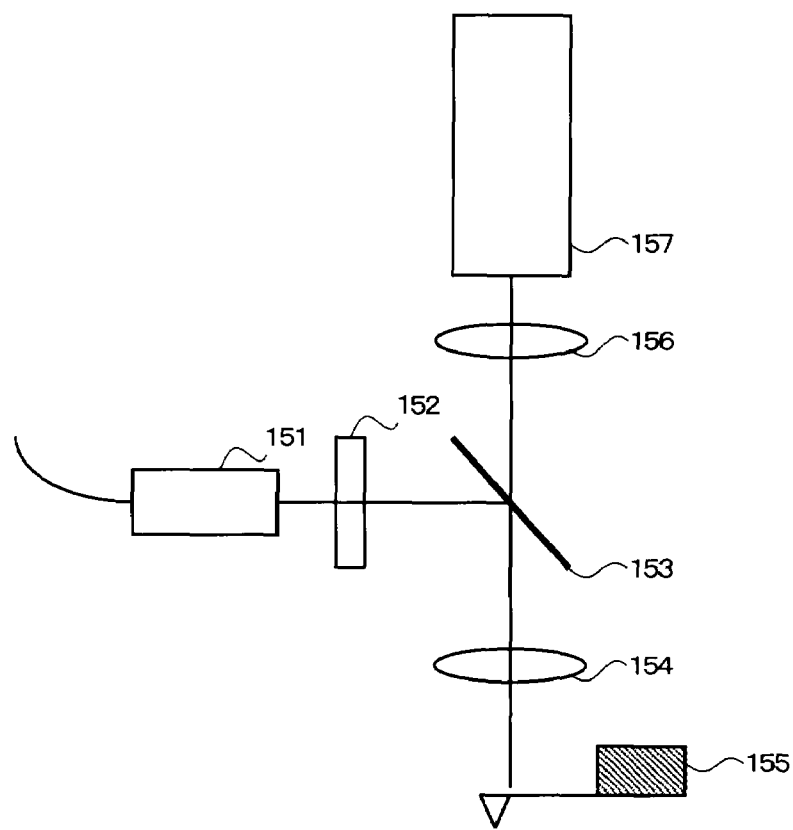
FIG. 13 is a diagrammatic view of a scanning force microscope, a substance sensor, or a mass sensor according to a fourteenth embodiment of the present invention, each having an optical microscope coaxially disposed with a cantilever-detecting optical system.

The foregoing tenth to thirteenth embodiments are applicable to measuring a torsion of a cantilever, and applicable to measuring a vibration amplitude of a probe in a plane parallel to the surface of a sample by detecting a high natural frequency of a torsion of a hard cantilever. FIG. 13 is a diagrammatic view of a scanning force microscope, a substance sensor, or a mass sensor according to a fourteenth embodiment of the present invention, each having an optical microscope coaxially disposed with a cantilever-detecting optical system.

In this figure, with respect to reference numerals 151 to 157, 151 denotes a laser emitter, 152 denotes a quarter wave plate, 153 denotes a dichroic mirror, 154 denotes an objective lens, 155 denotes a cantilever, 156 denotes an image-forming lens, and 157 denotes an image capture apparatus (image pickup device) such as a CCD camera.

As shown in the figure, by using a laser heterodyne interferometer, a laser homodyne interferometer, or an optical lever mechanism, each having an optical microscope coaxially disposed therewith, a laser spot can be positioned on a fine oscillator by using visual information of the optical microscope.

Figure 14:
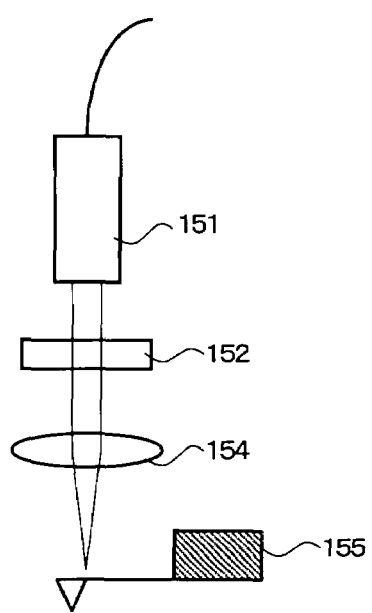
FIG. 14 illustrates the structure of a cantilever-exciting apparatus according to a fifteenth embodiment of the present invention.

FIG. 14 illustrates the structure of a cantilever-exciting apparatus according to a fifteenth embodiment of the present invention.

As shown in the figure, the structure in this embodiment is formed by excluding the image-forming lens 156, the CCD 157, and the dichroic mirror 153 from that in the foregoing fourteenth embodiment.

Next, sixteenth and seventeenth embodiments of the present invention will be described.

In a known optical-fiber-type interferometer, when a red laser having a wavelength of about 632 nm is used, a cut piece of an optical fiber having a core of 4 μm in diameter and a cladding of 125 μm in diameter is positioned away from a cantilever so as to perform a homodyne interference measurement. In this case, the following problems exist.

(1) When a sample smaller than 4 μm is irradiated with light, a large loss occurs.

(2) Since the cladding of 125 μm in diameter is large, a cantilever smaller than 100 μm causes a positional interference between the base of the cantilever and the cladding.

(3) Since reflected light generated due to a change in refractive index at an end surface of the optical fiber and sharing about 4% of the total quantity is used as reference light for performing the homodyne interference measurement, a signal intensity of interference is low.

(4) The distance between the cantilever and the optical fiber is not freely determined.

With a view of solving the above-mentioned problems, the following structure will be employed.

Figure 15:
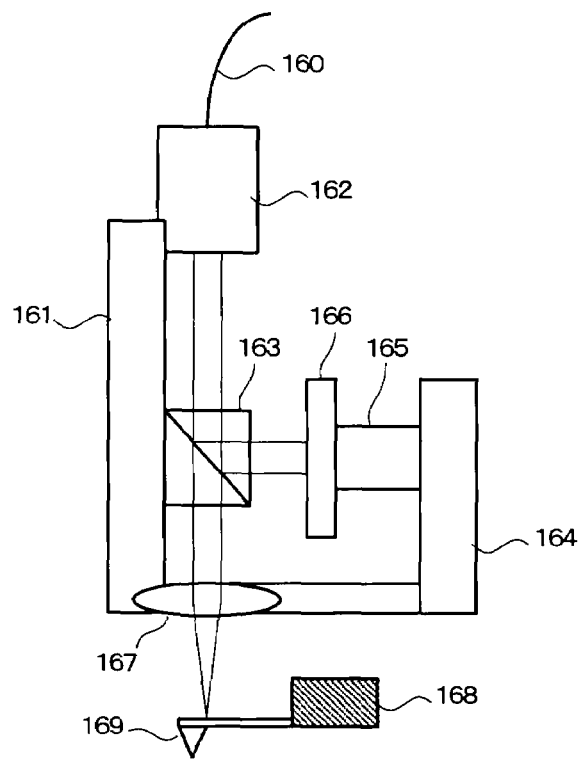
FIG. 15 illustrates the structure of a fine-cantilever-use optical-fiber homodyne laser interferometer according to a sixteenth embodiment of the present invention.

FIG. 15 illustrates the structure of a fine-cantilever-use optical-fiber homodyne laser interferometer according to the sixteenth embodiment of the present invention.

In this figure, with respect to reference numerals 160 to 169, 160 denotes an optical fiber, 161 denotes a first supporting member, 162 denotes a laser emitter, 163 denotes a beam splitter, 164 denotes a second supporting member, 165 denotes a mirror-positioning mechanism, 166 denotes a reference mirror, 167 denotes an objective lens, 168 denotes a cantilever-supporting member, and 169 denotes a cantilever.

By using the optical fiber 160, light can be easily introduced into a vacuum or a low-temperature environment and optical measurement can be easily performed; in addition, a collimating lens (not shown), the beam splitter 163, the reference mirror 166, the objective lens 167, and so forth are disposed at the measuring end portion of the optical fiber 160, and a focal point of a micron-sized laser is formed at least 1 mm away from the objective lens.

With this arrangement, in comparison with a known method for directly facing the optical fiber core to the cantilever, measurement of a displacement or a vibration frequency of the micron-sized cantilever 169 becomes more possible, and interference measurement using reference light having a high intensity becomes more possible. Also, a higher signal-to-noise ratio is achieved, thereby providing increased degrees of spatial design freedom.

With this structure, all the foregoing problems (1) to (4) can be solved.

Also, when it is required to observe an image of a cantilever or a sample with a homodyne laser interferometer, a fine cantilever-use optical fiber is formed so as to have the following structure.

Figure 16:
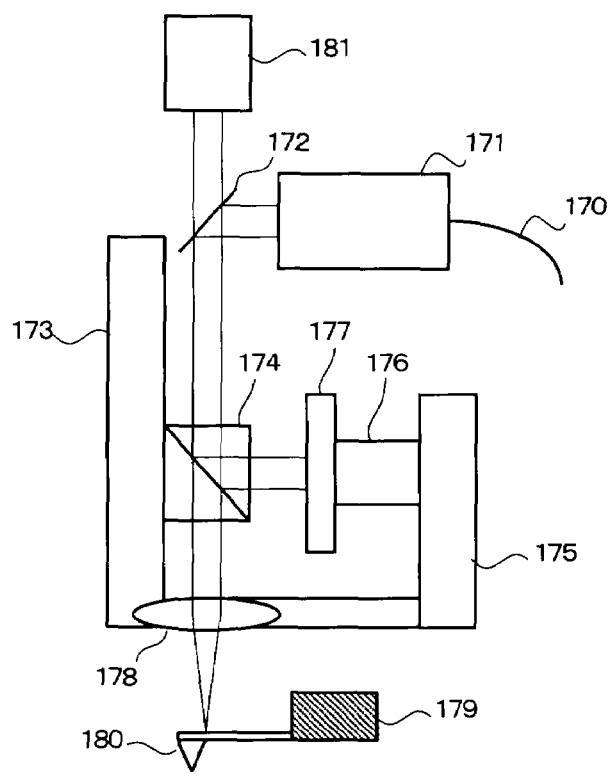
FIG. 16 illustrates the structures of a fine-cantilever-use optical-fiber homodyne laser interferometer according to a seventeenth embodiment of the present invention, for observing an image of a cantilever or a sample.

FIG. 16 illustrates the structure of a fine-cantilever-use optical-fiber homodyne laser interferometer according to the seventeenth embodiment of the present invention, for observing an image of a cantilever or a sample.

In this figure, with respect to reference numerals 170 to 181, 170 denotes an optical fiber, 171 denotes a laser emitter, 172 denotes a dichroic mirror, 173 denotes a first supporting member, 174 denotes a beam splitter, 175 denotes a second supporting member, 176 denotes a mirror-positioning mechanism, 177 denotes a reference mirror, 178 denotes an objective lens, 179 denotes a cantilever-supporting member, 180 denotes a cantilever, and 181 denotes a camera.

As shown in the figure, measuring light is introduced by using the dichroic mirror 172, and an image is observed with the camera 181 by using the light transmitted through the dichroic mirror 172.

With these methods, it is possible to vibrate the cantilever by modulating light having a different wavelength from that of the measuring light.

Next, an eighteenth embodiment of the present invention will be described.

Hitherto, a frequency which can be excited by a piezo element depends on the thickness of the element, a sonic speed and temperature in the element, the structure of the element, and so forth, and the piezo element has its own specific frequency characteristic. This problem is further prominent when a frequency to be excited becomes an order of MHz or higher.

For example, a vibration with a frequency up to a few MHz can be excited by a piezo element with a thickness of 50 µm, having an electrode and an insulating plate bonded thereto, and, in a frequency range of higher than that, a vibration can be excited only at discrete frequencies. Because of this problem, in the case of exciting a sample so as to vibrate in a frequency band of MHz or higher by using a piezo element or the like in order to measure the frequency characteristic of the sample, the frequency characteristic of the piezo element is superimposed on the frequency characteristic of the sample, thereby making it difficult or impossible to evaluate the frequency characteristic of the sample. In addition, as the frequency becomes higher, an error in a measured result becomes greater depending on a method for fixing the sample to the piezo element or quality of bonding the sample to the piezo element, thereby making it more difficult to evaluate the characteristic of the sample.

Likewise, in the case of exciting a force-detecting cantilever of a scanning probe microscope so as to vibrate by using a piezo element, when the natural frequency of the cantilever becomes higher in a frequency band of MHz or higher, it becomes more difficult to excite the cantilever. The possible cause for this problem is believed that an error in a measured result of the excitation characteristic of the cantilever occurs depending on a method for fixing the cantilever and the piezo element to each other, also in the case of exciting the cantilever. Also, in the case of exciting the cantilever in vacuum, it is required to dispose a vibration-exciting piezo element on the cantilever-supporting member and to carry out wiring to the piezo element, thereby making a product complicated.

The above problems cause the product to have deteriorated reliability and a deteriorated degree of vacuum, and make it difficult to magnify the scanning probe microscope and to heat the microscope at high temperature, for example.

In view of the foregoing circumstances, in this embodiment, there is provided a laser Doppler interferometer having an optically exciting function for exciting a sample, which allows the interferometer to perform a measurement in a high-frequency region and in a vacuum environment and to have a compact size and high reliability.

Figure 17:
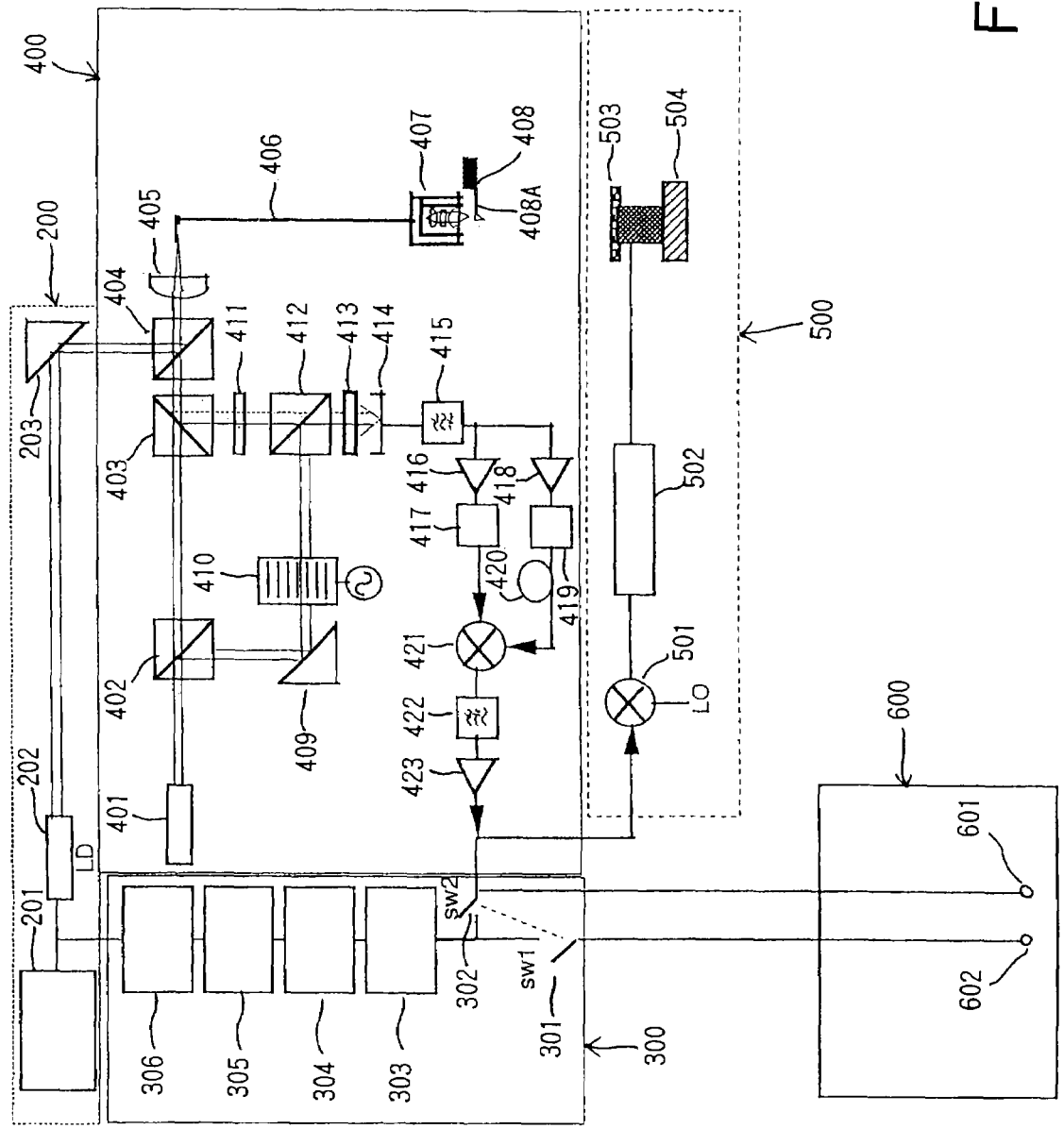
FIG. 17 illustrates the structure of a measuring apparatus for measuring the characteristics of a sample according to an eighteenth embodiment of the present invention, using a laser Doppler interferometer having an optically exciting function for exciting the sample.

FIG. 17 illustrates the structure of a measuring apparatus for measuring the characteristics of a sample according to an eighteenth embodiment of the present invention, using a laser Doppler interferometer having an optically exciting function for exciting the sample.

In this figure, the measuring apparatus for measuring the characteristics of the sample according to this embodiment is formed by an optically exciting unit 200, a signal-processing -unit 300, a laser-Doppler interfering unit 400, an AFM (atomic force microscope)-sample-stage controlling unit 500, and a network analyzer 600.

The optically exciting unit 200 is formed by a laser diode (LD) driver 201, a laser diode (LD) 202 driven by the LD driver 201, and a mirror 203.

Also, the signal-processing unit 300 is formed by a first switch (sw1) 301, a second switch (sw2) 302, a digitaliser 303, a phase shifter 304, a filter 305, and an amplifier 306.

The laser-Doppler interfering unit 400 is formed by a He-Ne laser 401, a first PBS (polarizing beam splitter) 402, a second PBS 403, an optical multiplexer 404, a lens 405, a polarization-maintaining fiber 406, a sensor head (laser emitter) 407 (assembly of a lens, a λ/4 plate, and a lens), a nano-cantilever 408, a probe 408A, a mirror 409, an AOM (acousto-optic modulator) 410, a λ/2 plate 411, a third PBS 412, a polarizer 413, a photo diode 414, a BPF (band-pass filter) 415, amplifiers 416, 418, and 423, digitalisers 417 and 419, a delay line 420, a DBM (double-balanced mixer) 421, and a LPF (low-pass filter) 422.

In addition, the AFM-sample-stage controlling unit 500 is formed by a DBM 501 connected to a LO (local oscillator), a controller 502, a sample 503, and a piezo element 504 of the sample 503.

The network analyzer 600 has a signal input terminal 601 and an evaluation output terminal 602.

Thus, in this embodiment; for example, output light of the laser diode (LD) 202 having a wavelength of 780 nm is superimposed on measuring light of a laser Doppler interferometer, emitted from the He-Ne (helium-neon) laser 401 and having a wavelength of 632 nm, and the superimposed light is introduced into the polarization-maintaining fiber 406 having a 4-µm core and is illuminated on the sample 503 via the laser emitter 407 and the nanocantilever 408. The wavelengths are not limited to the above ones.

The following usages are possible depending on measuring methods.

(1) An output signal of the laser-Doppler interfering unit 400 is subjected to phase conversion, amplification, and if needed, filtering or digitalization, and the laser diode 202 having a wavelength of 780 nm is modulated by using the processed signal. With this process, the sample 503 can be self-excited at its natural frequency. In other words, by selecting a filter characteristic, a specific vibration mode can be excited, thereby producing a self-excited vibration of a three-dimensional structure serving as a sample having a size of an order of nanometers to microns.

Also, by irradiating the cantilever 408 serving as a force-detecting element of the scanning probe microscope with light, the cantilever 408 is self-excited, and a change in self-excited frequency allows the interaction between the probe 408A disposed at the top of the cantilever 408 and the sample 503 or a change in mass to be detected.

(2) A signal whose frequency is swept by the network analyzer 600 is produced, and the laser diode 202 having a wavelength of 780 nm is modulated by using the signal. An output signal of the laser-Doppler interfering unit 400 is connected to the signal input terminal 601 of the network analyzer 600. With this process, the frequency characteristic of the sample 503 can be measured by using the network analyzer 600 and the laser-Doppler interfering unit 400 having an optically exciting function.

Meanwhile, measuring light and vibration-exciting light may use a common optical system by superimposing them or may be illuminated on a sample by using respectively different optical paths.

Also, light generated by the LD 202 for exciting a vibration of the cantilever 408 is superimposed on the optical-measurement probe light 401 of the laser-Doppler interfering unit 400. In this occasion, an output of a speed signal of the laser-Doppler interfering unit 400 is subjected to processing such as phase conversion, digitalization, and amplification, and light of a light source such as the laser diode 202 is modulated by using the signal or modulated at a frequency designated by an oscillator or at the swept frequency so that the light is used for excitation.

With the foregoing arrangement, a vibration specific to a measuring object to be measured by the laser Doppler interferometer is excited, whereby the frequency characteristic of the measuring object can be measured, and measurement or processing by making use of the vibration is possible.

Next, a nineteenth embodiment of the present invention will be described.

When the vibration characteristic of a sample is evaluated by a laser Doppler interferometer, it has been required to bond a piezo element to the sample so as to excite it, or to irradiate the sample with modulated light.

Figure 18:
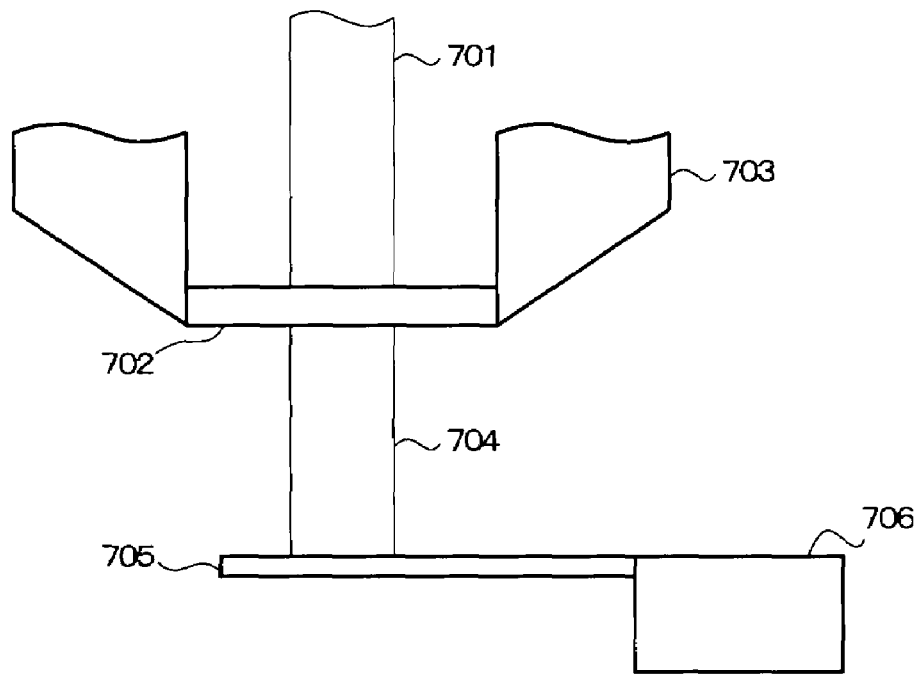
FIG. 18 is a diagrammatic view of a measuring apparatus for measuring the frequency characteristic of a sample according to a nineteenth embodiment of the present invention.

FIG. 18 is a diagrammatic view of a measuring apparatus for measuring the frequency characteristic of a sample according to the nineteenth embodiment of the present invention.

In this figure with respect to reference numerals 701 to 706, 701 denotes a laser, 702 denotes a lens, 703 denotes a supporting portion of the lens, 704 denotes an interference cavity (air gap), 705 denotes a sample, and 706 denotes a sample-supporting portion.

In this embodiment, by using the laser 701 of a laser Doppler interferometer serving as measuring light having a uniform quantity, and the interference cavity 704, one end of which is formed by the sample 705, the sample 705 is excited at its natural frequency so that its amplitude, speed, and frequency are measured by using the laser Doppler interferometer.

When the sample 705 is to be irradiated with the measuring light of the laser Doppler interferometer, the measuring apparatus is arranged such that the sample 705 forms the interference cavity 704 together with a certain optical plane. When the interference cavity 704 becomes an integral multiple of a half wavelength of the laser Doppler interferometer, a vibration of the sample 705 occurs. The vibration has the same frequency as the natural frequency of the sample 705. The vibration is measured by the laser Doppler interferometer.

By making use of this vibration function, a vibration of a sample can be excited without using modulated optical-excitation light.

A twentieth embodiment of the present invention will be described below.

When a three-dimensional nano-microstructure is used as a sensor or an actuator by vibrating it, a piezo element or a surface acoustic element has been used.

In the embodiment of the present invention, an exciting function using light is adapted to an oscillatory structure so as to perform actuation, processing, or sensing. Meanwhile, the following papers and so forth have revealed the fact that, when a part of a structure in which a standing wave of light is generated by interference is oscillatory, a self-excited vibration occurs or a vibration is generated by intensity-modulated light.

(1) "Optically activated vibrations in a micromachined silica structure", S. Venkatesh, Electron letters, 21 315 (1985).

(2) "Optically activation of a silicon vibrating sensor", M. V. Andres, K. W. H. Foulds, M. J. Tudor, Electronics Letters, 22 1099 (1986).

(3) "Self-excited vibration of a self-supporting thin film caused by laser irradiation", K. Hane, K. Suzuki, Sensors and Actuators A51, 179-182 (1996).

In recent years, since the silicon micromachine technology has allowed a cantilever array having a density of at least a million pieces per square centimeter to be prepared, it is expected to perform measurement, processing, actuation using the cantilever array. However, a method for exciting a specific group of cantilevers or all cantilevers in the cantilever array has not yet been established.

The following description is concerned about a method for adapting an excitation method by making use of optical excitation to a cantilever array and creation of a new function with the method. This will be described below one by one.

Figure 19:
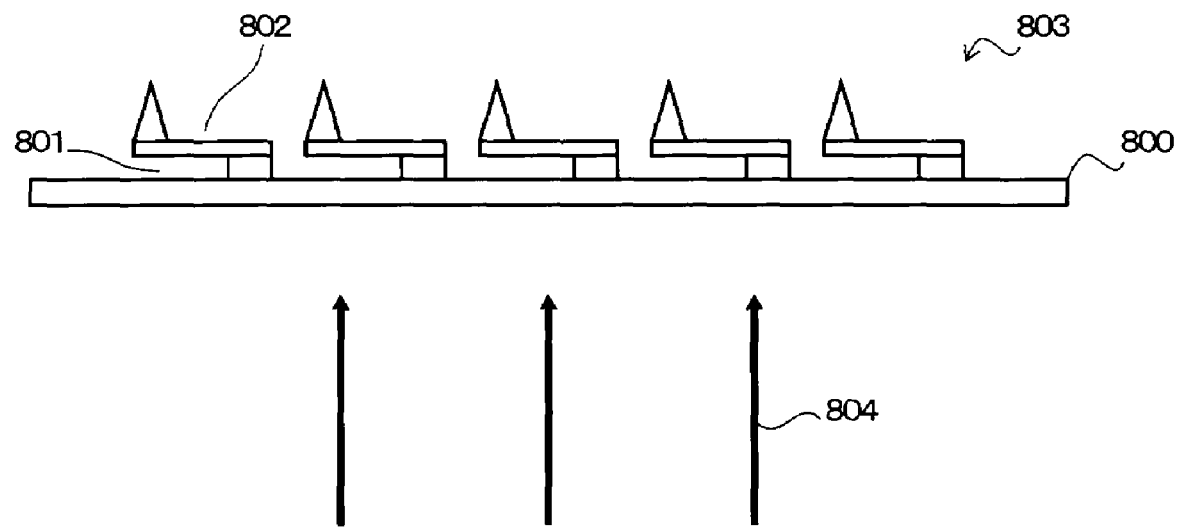
FIG. 19 is an illustration of a method for exciting cantilevers according to a twentieth embodiment of the present invention.

FIG. 19 is an illustration of a method for exciting cantilevers according to the twentieth embodiment of the present invention.

In this figure, with respect to reference numerals 800 to 804, 800 denotes a substrate, 801 denotes interference cavities, 802 denotes a plurality of cantilevers formed on the substrate 800, each equipped with a probe and having the corresponding interference cavity 801, 803 denotes a cantilever array formed by the cantilevers 802, and 804 denotes laser light.

In this embodiment, a clearance (interference cavity length) of each interference cavity (air gap) 801 lying between the cantilever array 803 and the substrate 800 is determined so as to be an integral multiple of a wave length used for optical excitation, and the rear surface of the substrate 800 is irradiated with the laser light 804 serving as vibration-exciting light having a uniform quantity. Each cantilever 802 is self-excited by a standing wave of light lying in the corresponding interference cavity (air gap) 801 and by a change in the characteristic of the cantilever 802. Even when the cantilevers 802 forming the cantilever array 803 do not have the same natural frequency, each cantilever 802 is self-excited at its natural frequency.

Figure 20:
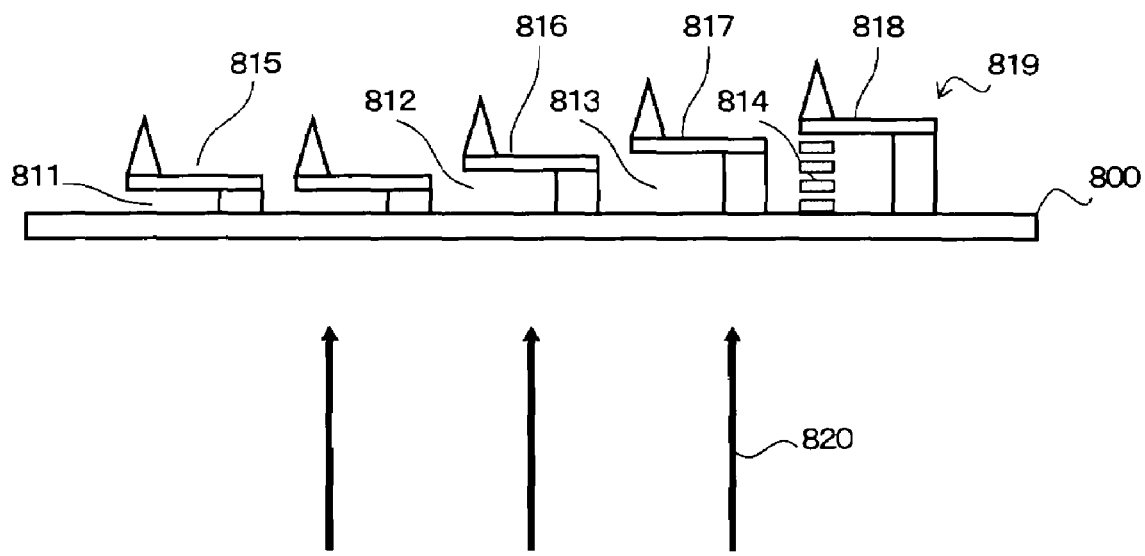
FIG. 20 is an illustration of a method for exciting cantilevers according to a twenty first embodiment of the present invention.

FIG. 20 is an illustration of a method for exciting cantilevers according to a twenty first embodiment of the present invention.

In this figure, with respect to reference numerals 800, and 815 to 820, 800 denotes the substrate, 815, 816, 817, and 818 denote cantilevers formed on the substrate 800, equipped with respective probes and respectively having interference cavities 811, 812, 813, and 814, 819 denotes a cantilever array formed by the cantilevers 815, 816, 817, and 818, and 820 denotes laser light (wavelength λ) having a uniform quantity.

In this embodiment, in the cantilever array 819, clearances of the interference cavities (air gaps) formed by the substrate 800 vary group by group of the cantilevers 815 to 818. With this arrangement, a wavelength of vibration-exciting light can be determined so as to excite only an intended group of cantilevers.

Figure 21:
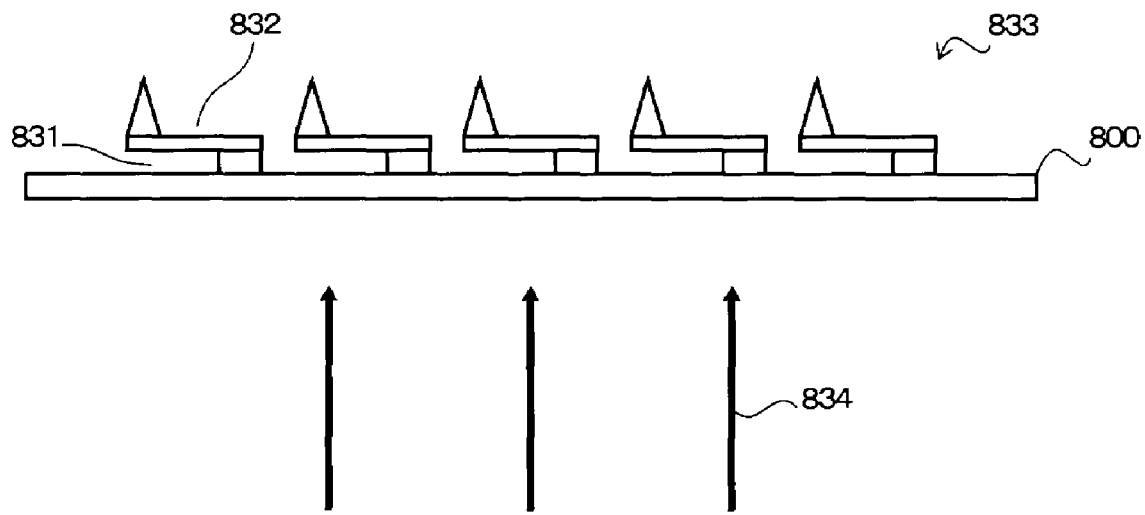
FIG. 21 is an illustration of a method for exciting cantilevers according to a twenty second embodiment of the present invention.

FIG. 21 is an illustration of a method for exciting cantilevers according to a twenty second embodiment of the present invention.

In this figure, with respect to reference numerals 800, and 832 to 834, 800 denotes the substrate, 832 denotes cantilevers formed on the substrate 800, each equipped with a probe and having an interference cavity 831, 833 denotes a cantilever array formed by the cantilevers 832, and 834 denotes intensity-modulated laser light.

Figure 22:
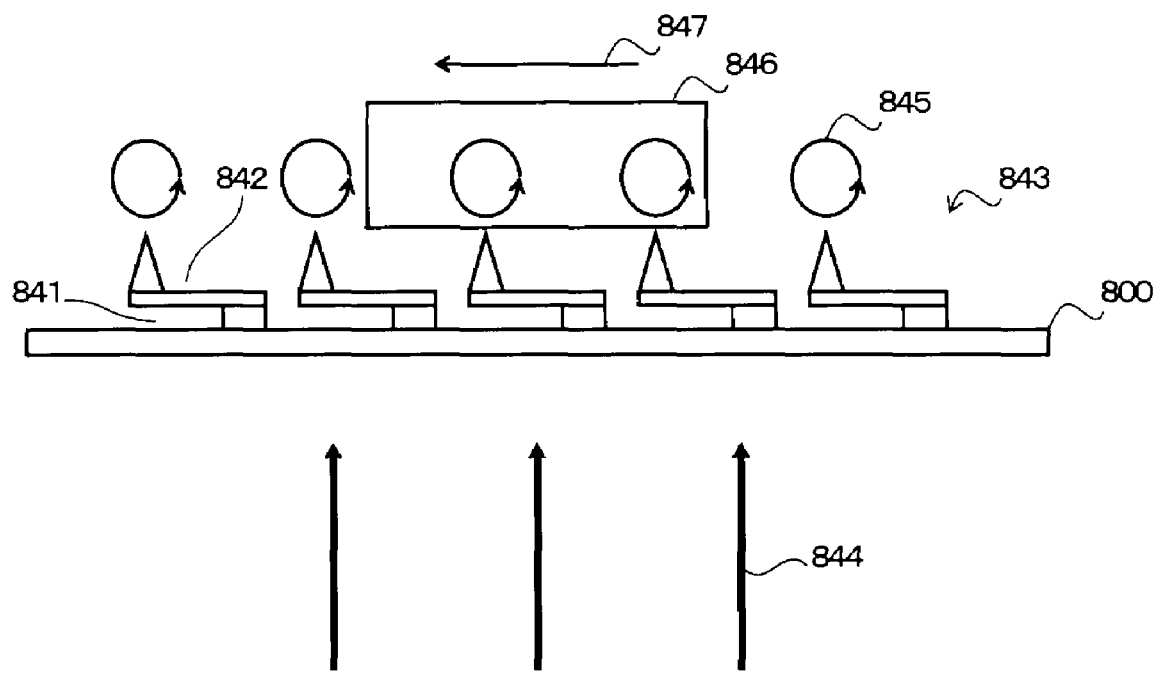
FIG. 22 is an illustration of a method for exciting cantilevers according to a twenty third embodiment of the present invention.

In this embodiment, the rear surface of the substrate 800 of the cantilever array 833 is irradiated with the laser light 834 serving as quantity-modulated, vibration-exciting light. The cantilevers 832 having a natural frequency in agreement with the frequency for the quantity-modulation are excited. With this arrangement, a specific group of cantilevers can be selectively excited FIG. 22 is an illustration of a method for exciting cantilevers according to a twenty third embodiment of the present invention.

In this figure, with respect to reference numerals 800, and 842 to 847, 800 denotes the substrate, 842 denotes cantilevers formed on the substrate 800, each equipped with a probe and having an interference cavity 841, 843 denotes a cantilever array formed by the cantilevers 842, 844 denotes laser light (wavelength λ) having a uniform intensity, 845 denotes a path of the top of each probe, 846 denotes a slider, and 847 denotes a displacing direction of the slider 846.

In this embodiment, since the substrate 800 having the cantilevers 842 equipped with a million pieces of probes per square centimeter has its own weight of about 0.1 g, when all probes support the own weight, each probe bears its share of a load of 1 nN. When optical excitation is performed in such a state, vibrations of the cantilevers 842 are excited. When the optical excitation has an anisotropic property with which the top of each probe depicts an elliptical vibration, the substrate 800 having the cantilever array 843 moves in a direction parallel to the plane of the figure in accordance with the excitation of vibration.

Also, when the probes lie upwards, and the slider 846 serving as a physical object is placed on them, the slider 846 is displaced. The cantilever array is designed such that, when all probes come into contact with the slider 846 at the same time, a Q factor of the slider 846 decreases, and when sufficient oscillatory energy cannot be stored in the oscillators, the probes and the slider 846 less often come into contact with each other, for example, by making the heights of the probes uneven.

Figure 23:
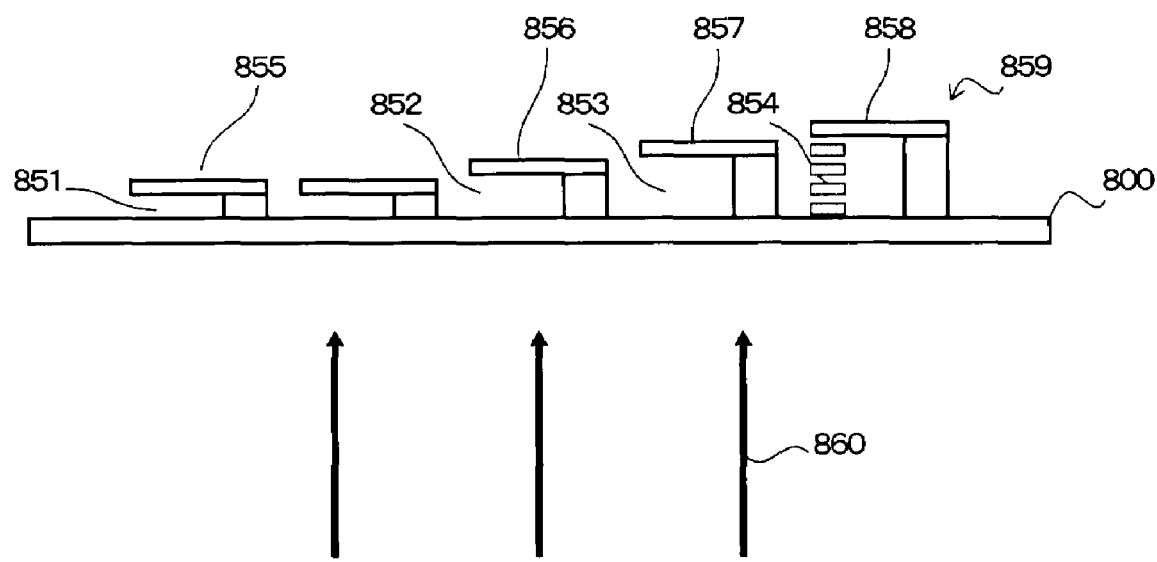
FIG. 23 is an illustration of a method for exciting cantilevers according to a twenty fourth embodiment of the present invention.

FIG. 23 an illustration of a method for exciting cantilevers according to a twenty fourth embodiment of the present invention.

In this figure, with respect to reference numerals 800, and 855 to 860, 800 denotes the substrate, 855, 856, 857, 858 denote cantilevers formed on the substrate 800 and respectively having interference cavities 851, 852, 853, and 854 (wherein 855 denotes a cantilever equipped with a reactive film a, 856 denotes a cantilever equipped with a reactive film b, 857 denotes a cantilever equipped with a reactive film c, and 858 denotes a cantilever equipped with a reactive film d), 859 denotes a cantilever array formed by these cantilevers, and 860 denotes laser light (wavelength λ) having a uniform quantity.

In this embodiment, a specific thin film is applied on the corresponding group of the cantilevers so as to react to a specific substance. In order to check existence of the specific substance, in accordance with the foregoing method, a vibration frequency or a wavelength of light with which vibrations of the group of the cantilevers are excited is determined. With this arrangement, measurement can be performed by using only a specific group of the cantilevers in the cantilever array 859.

Figure 24:
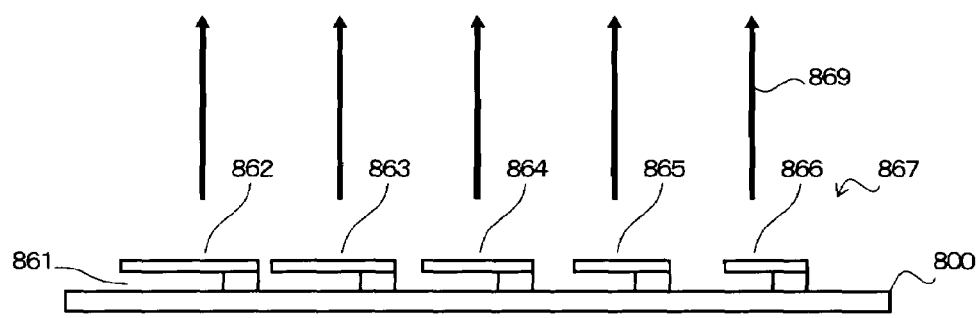
FIG. 24 is an illustration of a method for exciting cantilevers according to a twenty fifth embodiment of the present invention.

FIG. 24 is an illustration of a method for exciting cantilevers according to a twenty fifth embodiment of the present invention.

In this figure, with respect to reference numerals 800, and 862 to 869, 800 denote the substrate, 862 to 866 denote cantilevers formed on the substrate 800 and having respective interference cavities 861 and respectively different natural frequencies, 867 denotes a cantilever array formed by these cantilevers, 868 denotes laser light (wavelength λ) having a uniform intensity with which the rear surface of the substrate 800 is irradiated, and 869 denotes a plurality of kinds of laser light (wavelength λ) having respectively different intensity-modulation frequencies.

In this embodiment, by irradiating the cantilever array 867 with the laser light 868 having a uniform intensity so as to excite vibrations of the cantilevers 862 to 866, the clearance of each interference cavity 861 varies at a certain frequency so as to modulate the quantities of reflected light or transmitted light at the same frequency. When the cantilever array 867 formed by a group of the cantilevers having respectively different frequencies is irradiated with the laser light 868 having a uniform intensity, the light 869 modulated at the plurality of modulation frequencies can be obtained as reflected light or transmitted light.

Figure 25:
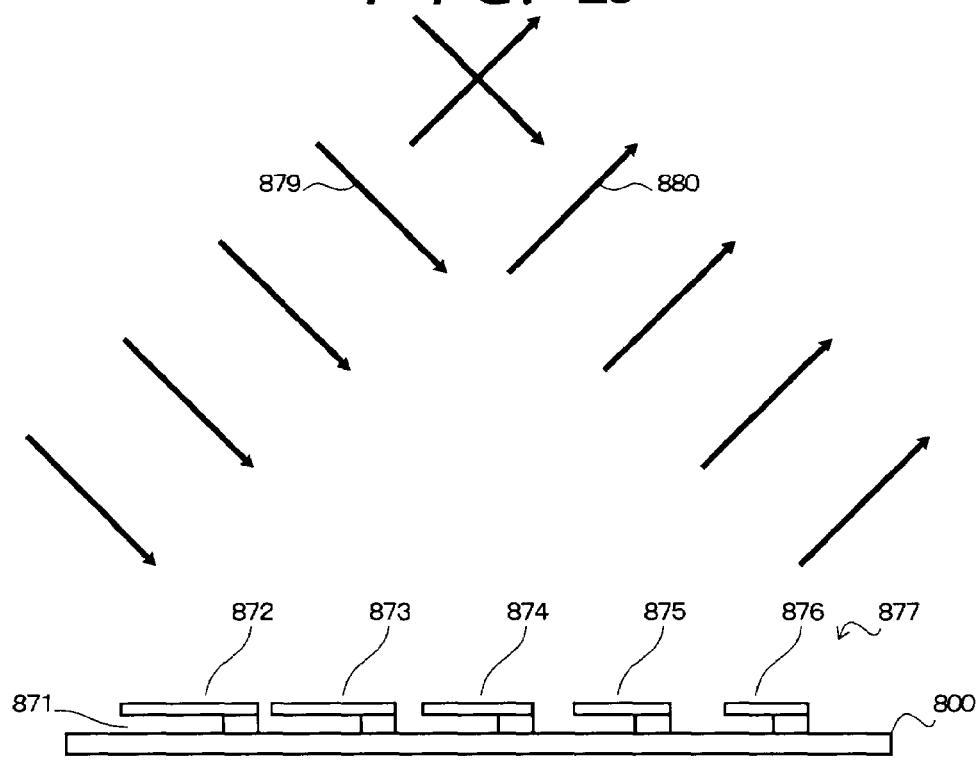
FIG. 25 is an illustration of a method for exciting cantilevers according to a twenty sixth embodiment of the present invention.

FIG. 25 is an illustration of a method for exciting cantilevers according to a twenty sixth embodiment of the present invention.

In this figure, with respect to reference numerals 800 and 872 to 880, 800 denote the substrate, 872 to 876 denote cantilevers formed on the substrate 800 and having respective interference cavities 871 and respectively different natural frequencies, 877 denotes a cantilever array formed by these cantilevers, 878 denotes laser light (wavelength λ) having a uniform intensity with which the rear surface of the substrate 8.00 is irradiated, 879 denotes incident light having a uniform wavelength with which the substrate 800 is irradiated obliquely from above, and 880 denotes five kinds of laser light (wavelengths $\lambda_1$, $\lambda_2$, $\lambda_3$, $\lambda_4$, $\lambda_5$) having respectively different frequencies.

In this embodiment, the cantilever array 877 is irradiated with the laser light 878 having a uniform intensity so as to generate waves on the surface of the cantilever 877 so that a frequency of reflected light or transmitted light is modulated.

Meanwhile, the structure for generating photoacoustic modulation is not limited to the cantilevers and may include a oscillatory structure such as a both-ends-supported beam. Meanwhile, the present invention is not limited to the foregoing embodiments, and since a variety of modifications are possible on the basis of the spirit of the present invention, these modifications shall not be excluded from the scope of the present invention.

As has been described above in detail, according to the present invention, the following advantages are obtained.

(A) A simple structure can be achieved and a surface of a sample can be reliably detected on the order of nanometers.

(B) When activated in sliding directions by using a cantilever array formed by a large number of compliant cantilevers, a sliding surface is very unlikely to provide a frictional condition.

(C) By exerting vibrations and also propagating a surface acoustic wave, the surface acoustic wave having an amplitude of a few nm is amplified with Q factors of oscillators, whereby efficiencies of an actuator and an optical modulator can be improved.

(D) The entire surface of a sample can be observed by making use of optical-lever incident light and a large number of cantilevers.

(E) While cantilever-shaped members slide on the surface of a sample, fine irregularities can be detected as changes in luminance in accordance with reflecting states of light with which, the surface is irradiated.

(F) A scanning probe microscope in which displacements of a large number of cantilevers are detected by an optical interferometer can be constructed.

(G) A scanning force microscope using a heterodyne laser Doppler meter can be constructed. That is, the heterodyne laser Doppler meter can be used for detecting a vibration of a cantilever.

(H) A laser spot can be positioned on a fine oscillator by using visual information of an optical microscope.

(I) The frequency characteristic of a three-dimensional structure as a sample can be accurately evaluated in a high-frequency band.

(J) By performing excitation and detection both with light, the mechanical part of a product can be simplified and miniaturized, accordingly improving reliability and cleanliness of the product.

(K) By performing excitation and detection both with light, measurement can be achieved only by illuminating light on a sample, whereby a large number of samples can be evaluated with a high time efficiency.

(L) By performing excitation and detection both with light, a product has a simple and compact structure and high cleanliness in a special environment such as in ultra-vacuum or at very low temperatures.

(M) When a sample is to be irradiated with measuring light of a laser Doppler interferometer, by disposing the sample so as to form an interference cavity with a certain optical plane, the sample is self-excited at its natural frequency, whereby an amplitude, a speed, and a frequency of the sample can be measured by using the laser Doppler interferometer.

(N) By adapting an excitation method by making use of optical excitation to a cantilever array, new functions such as actuation, substance selection, substance recognition, optical modulation and mass sensing can be created.

INDUSTRIAL APPLICABILITY

According to the present invention, a surface of a sample can be detected on the order of nanometers; efficiencies of an actuator and an optical modulator can be improved; fine irregularities can be detected as changes in luminance; a vibration of each cantilever can be detected; a large number of samples can be evaluated; by self-exciting a sample at its natural frequency, its amplitude, speed, and frequency can be measured; and actuation, substance selection, substance recognition, optical modulation and mass sensing can be performed. Also, the present invention is especially suitable for a measuring device and a sensor for measuring the characteristic of a sample.

The invention claimed is:

1. A scanning probe microscope, comprising:
a heterodyne laser Doppler meter, the heterodyne laser Doppler meter configured to detect a vibration of a cantilever having a high natural frequency with a high S/N ratio by making a diameter of a laser spot smaller and making a signal intensity higher as a vibration frequency of the cantilever becomes higher, and configured to measure a speed at two points of the vibrating cantilever by Doppler measurement.

2. An optical-fiber homodyne laser interferometer, comprising:
a fine-cantilever-detecting optical system for positioning a small laser spot having a small laser spot diameter at a fine cantilever and for detecting a vibration of the fine cantilever having a high natural frequency with a high S/N ratio, the fine-cantilever-detecting optical system measuring a speed at two points of the vibrating fine cantilever by Doppler measurement.

3. The optical-fiber homodyne laser interferometer according to claim 2, further comprising an optical microscope coaxially disposed with the fine-cantilever-detecting optical system.

4. A heterodyne laser Doppler interferometer, comprising:
an optically exciting unit configured to excite a measuring object, the optically exciting unit including a laser diode driver, a laser diode driven by the laser diode drive, and a mirror for receiving laser light from the laser diode;
a signal processing unit connected to the optically exciting unit and including a first switch, a second switch branching off from the output side of the first switch, a digitizer connected to the output side of the first switch, a phase shifter connected to the digitizer, a filter connected to the phase shifter, and an amplifier connected to the filter and the output side of the laser diode driver;
a heterodyne laser Doppler interfering unit connected to the optically exciting unit and including a He-Ne laser, a first polarizing beam splitter for receiving a laser light from the He-Ne laser, a second polarizing beam splitter for receiving the light from the first polarizing beam splitter, a optical multiplexer for multiplexing the light from the second polarizing beam splitter and the light from the mirror, a lens for receiving the output light from the optical multiplexer, a polarization-maintaining fiber connected to the lens, and laser emitter connected to the polarization-maintaining fiber;
an atomic force microscope-sample-stage controlling unit connected to the heterodyne laser Doppler interfering unit and comprising a double-balanced mixer connected to a local oscillator, a controller connected to the double-balanced mixer, as a sample serving as the measuring object and connected to the controller, and a piezo element for driving the sample; and
a network analyzer connected to the signal processing unit,
wherein an output light from the laser diode serving as vibration-exciting light is modulated and superimposed on measuring light of the heterodyne laser Doppler interferometer emitted from the He-Ne laser, and the superimposed light is illuminated on the sample via the laser emitter.

5. The heterodyne laser Doppler interferometer according to claim 4, comprising a self-excited loop including the heterodyne laser Doppler interfering unit.

6. The heterodyne laser Doppler interferometer according to claim 4, wherein the output light from the laser diode is modulated by using a signal whose frequency is swept by the network analyzer, and a vibration of the sample is excited by using the modulated light, and an output of the laser Doppler interferometer observing a vibration of the sample at the same time is connected to a signal input of the network analyzer so as to measure the frequency characteristic and the vibration mode of the sample.

7. The heterodyne laser Doppler interferometer according to claim 4, wherein the vibration-exciting light is superimposed on measuring light of the laser Doppler interferometer so as to measure and excite a vibration with a single light path.

* * * * *

UNITED STATES PATENT AND TRADEMARK OFFICE
CERTIFICATE OF CORRECTION

| | | |
|---|---|---|
| PATENT NO. | : 7,545,508 B2 | Page 1 of 1 |
| APPLICATION NO. | : 11/454986 | |
| DATED | : June 9, 2009 | |
| INVENTOR(S) | : Kawakatsu | |

It is certified that error appears in the above-identified patent and that said Letters Patent is hereby corrected as shown below:

On the title page, Item (30), the Foreign Application Priority Data has been omitted. Item (30) should read:

-- (30) Foreign Application Priority Data

Jun. 19, 2001 (JP).......................................2001-184604
May 31, 2002 (JP).......................................2002-160482 --

Signed and Sealed this

Fourth Day of August, 2009

JOHN DOLL
*Acting Director of the United States Patent and Trademark Office*